United States Patent
Shen et al.

(10) Patent No.: US 9,090,468 B2
(45) Date of Patent: Jul. 28, 2015

(54) PROCESS OF MAKING METAL CHALCOGENIDE PARTICLES

(75) Inventors: Zhigang Shen, Singapore (SG); Meng Tack Ng, Singapore (SG); Sung Lai Jimmy Yun, Singapore (SG); Jianfeng Chen, Singapore (SG); Yit Wooi Goh, Singapore (SG); Wei Kian Soh, Singapore (SG)

(73) Assignee: NANOMATERIALS TECHNOLOGY PTE LTD, Singapore (SG)

( * ) Notice: Subject to any disclaimer, the term of this patent is extended or adjusted under 35 U.S.C. 154(b) by 548 days.

(21) Appl. No.: 12/743,989

(22) PCT Filed: Nov. 20, 2008

(86) PCT No.: PCT/SG2008/000442
§ 371 (c)(1),
(2), (4) Date: Jul. 22, 2010

(87) PCT Pub. No.: WO2009/067088
PCT Pub. Date: May 28, 2009

(65) Prior Publication Data
US 2010/0298123 A1    Nov. 25, 2010

Related U.S. Application Data

(60) Provisional application No. 60/989,698, filed on Nov. 21, 2007.

(30) Foreign Application Priority Data

Jul. 31, 2008  (SG) .............................. 200805714-3

(51) Int. Cl.
*C01B 19/00*  (2006.01)
*C01B 17/20*  (2006.01)
(Continued)

(52) U.S. Cl.
CPC ................. *C01B 17/20* (2013.01); *B82Y 30/00* (2013.10); *C01F 17/0043* (2013.01); *C01G 3/02* (2013.01); *C01G 9/02* (2013.01); *C01G 49/08* (2013.01); *C09C 1/043* (2013.01); *C09C 1/24* (2013.01); *C09C 3/08* (2013.01); *C09C 3/12* (2013.01);
(Continued)

(58) Field of Classification Search
None
See application file for complete search history.

(56) References Cited

U.S. PATENT DOCUMENTS

| 7,229,602 B2 * | 6/2007 | Chin et al. ................... 423/508 |
| 2003/0003043 A1 | 1/2003 | Ishida |
| 2005/0222325 A1 | 10/2005 | Brotzman, Jr. |

FOREIGN PATENT DOCUMENTS

| JP | 2002-537219 A | 11/2002 |
| WO | 2006/057467 A1 | 6/2006 |

OTHER PUBLICATIONS

Surface Modification of ZnO Nanocrystals. By Y.L. Wu et al. Applied Surface Science 253 (2007) p. 5473-5479.*

(Continued)

*Primary Examiner* — Melvin C Mayes
*Assistant Examiner* — Colette Nguyen
(74) *Attorney, Agent, or Firm* — Ladas & Parry LLP

(57) ABSTRACT

There is disclosed a process of making metal chalcogenide particles. The process comprises the steps of reacting a metal salt solution with a precipitant solution under conditions to form metal chalcogenide particles and by-product thereof, coating the metal chalcogenide particles with a surfactant; and separating the surfactant coated chalcogenide particles from the by-product to obtain metal chalcogenide particles substantially free of by-product.

17 Claims, 15 Drawing Sheets

(51) Int. Cl.
*B82Y 30/00* (2011.01)
*C01F 17/00* (2006.01)
*C01G 3/02* (2006.01)
*C01G 9/02* (2006.01)
*C01G 49/08* (2006.01)
*C09C 3/08* (2006.01)
*C09C 3/12* (2006.01)
*C09C 1/04* (2006.01)
*C09C 1/24* (2006.01)

(52) U.S. Cl.
CPC ......... *C01P 2002/72* (2013.01); *C01P 2004/04* (2013.01); *C01P 2004/52* (2013.01); *C01P 2004/64* (2013.01); *C01P 2006/22* (2013.01)

(56) References Cited

OTHER PUBLICATIONS

Y.L. Wu, et al; "Surface modification of ZnO nanocrystals", Applied Surface Science, vol. 253, pp. 5473-5479, Apr. 15, 2007, available online Jan. 23, 2007, See the abstract, experimental section and figures 1-4.

M.S. Sorokin, et al; "A Route to Organyl(trialkoxysilyl)chalcogenides and Dichalcogenides, Bis(trialkoxysilylmethyl)chalcogenides and Dichalcogenides", Russian Journal of General Chemistry, vol. 71, No. 12, 2001, pp. 1883-1890, See the abstract, experimental section and figures 1-4.

International Search Report: PCT/SG2008/000442.

Extended European Search Report dated Dec. 17, 2013; Appln. No. 08851226.4-1355 / 2222598 PCT/SG2008000442.

\* cited by examiner

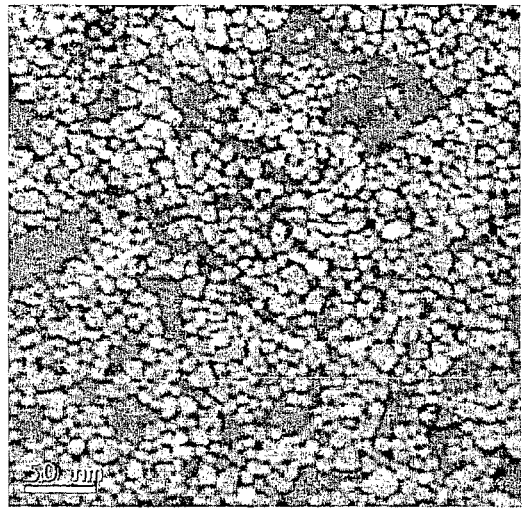
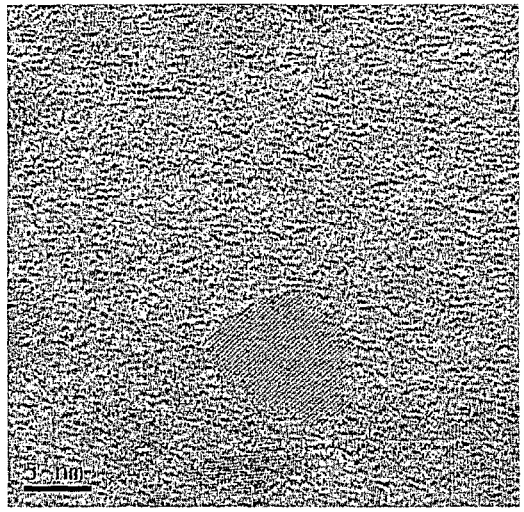
Fig. 2A                Fig. 2B
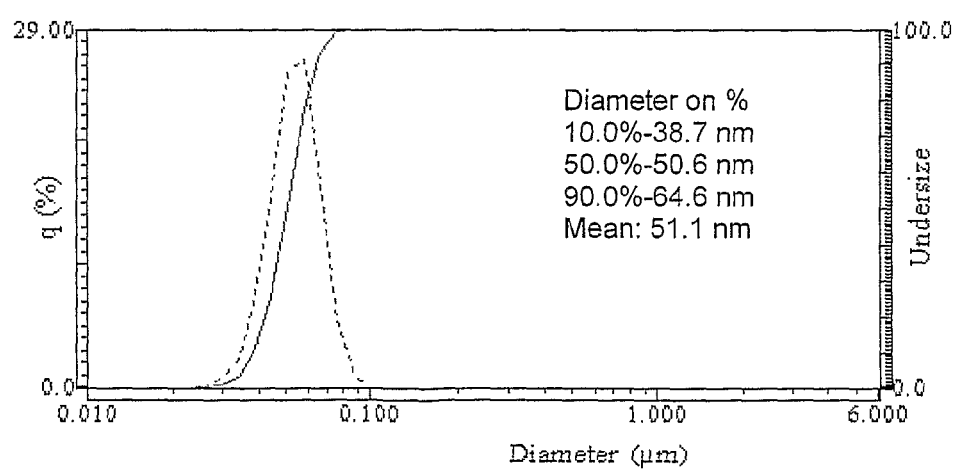
Fig. 3

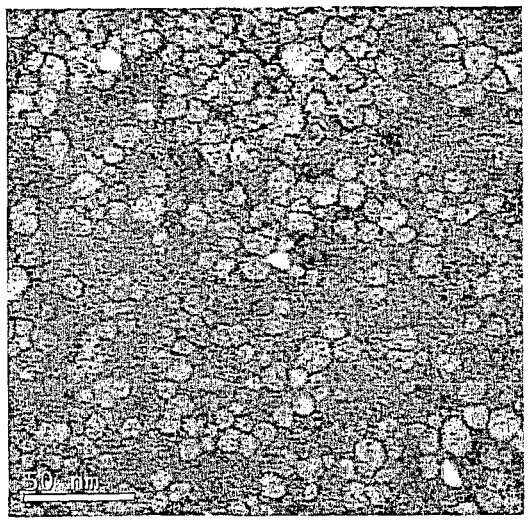 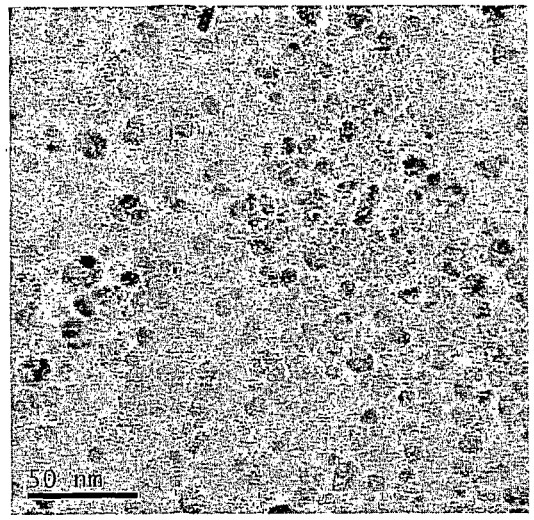
Fig. 10A  Fig. 10B
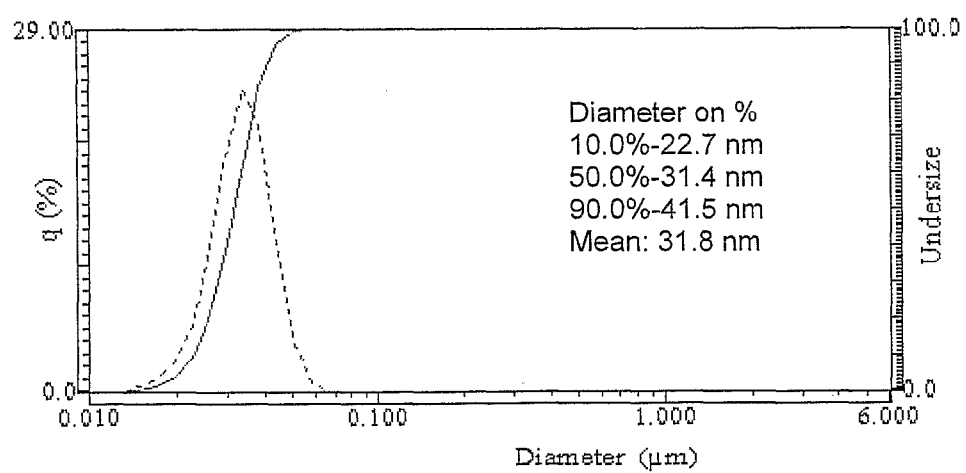
Fig. 11

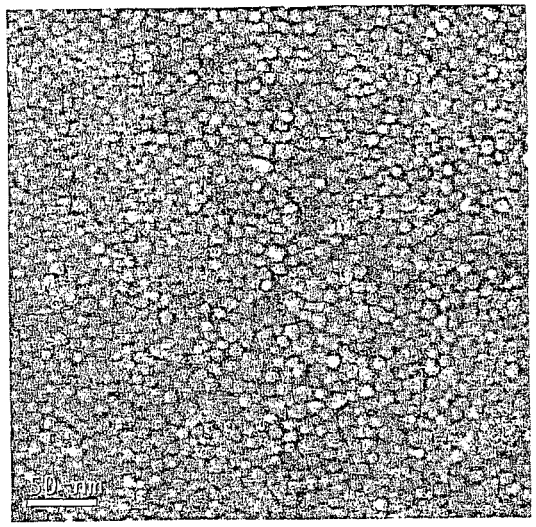
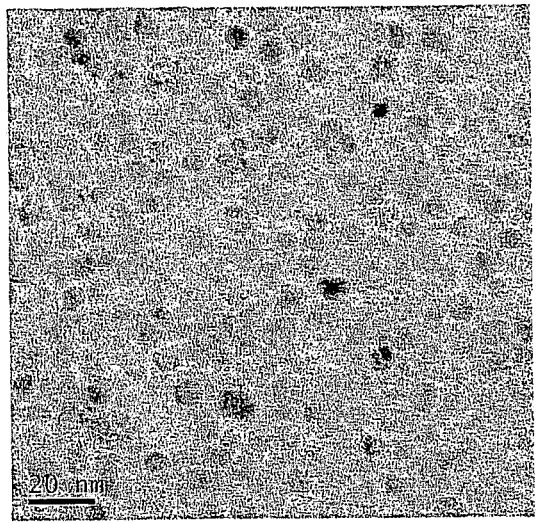
Fig. 12A  Fig. 12B
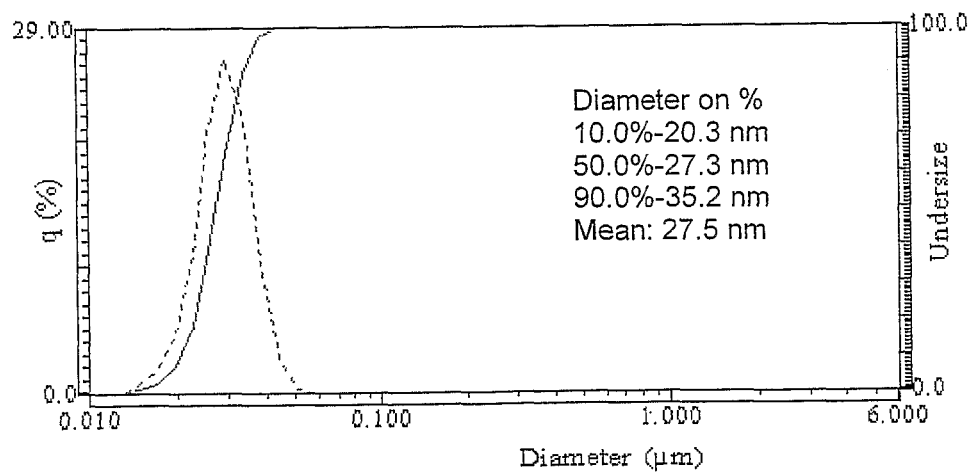
Fig. 13

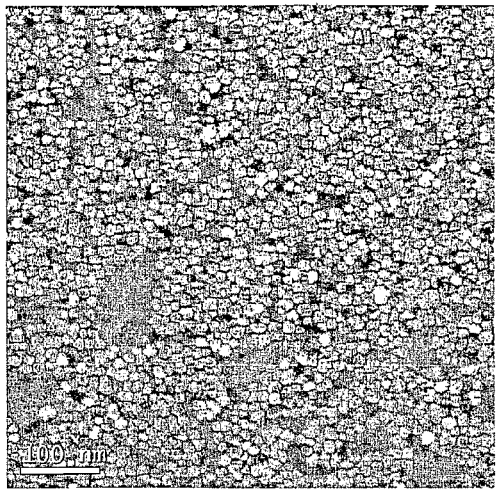 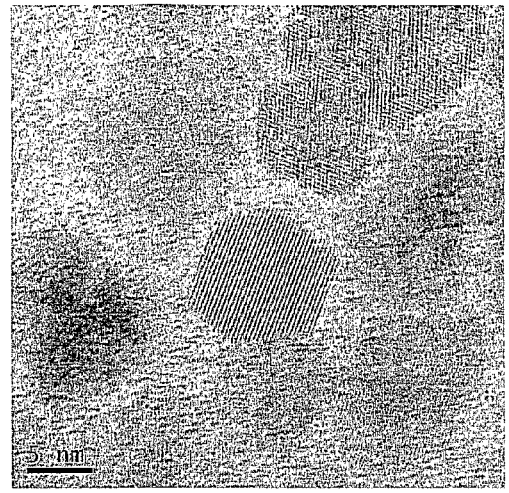
Fig. 14A Fig. 14B
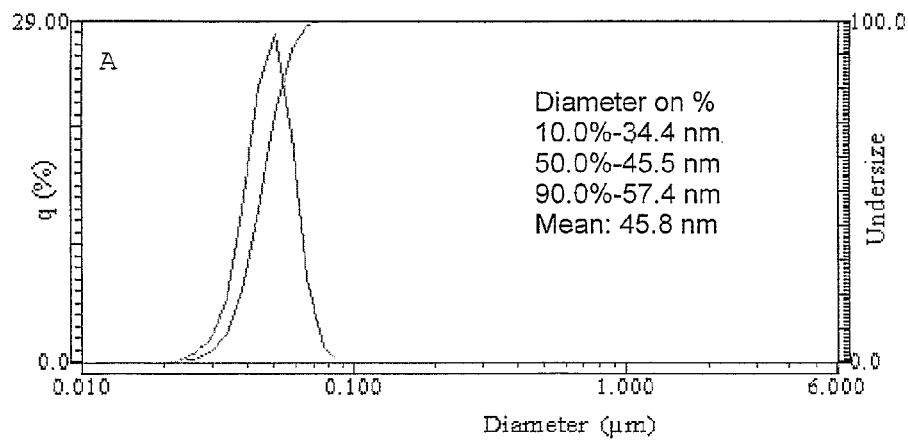
Fig. 15A
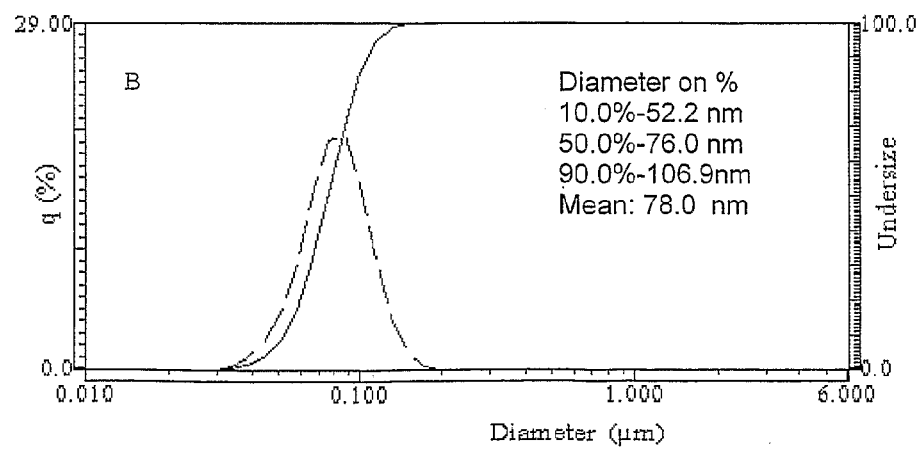
Fig. 15B

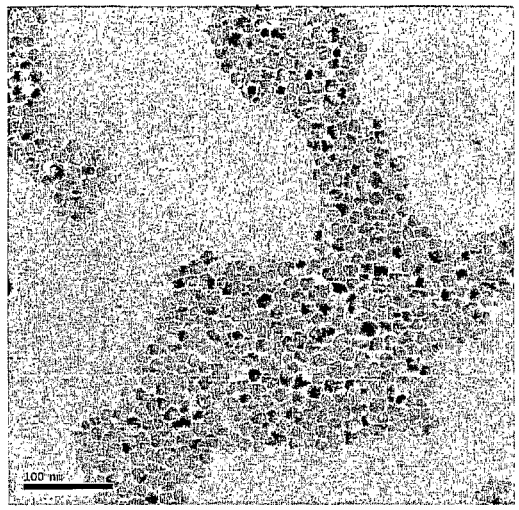 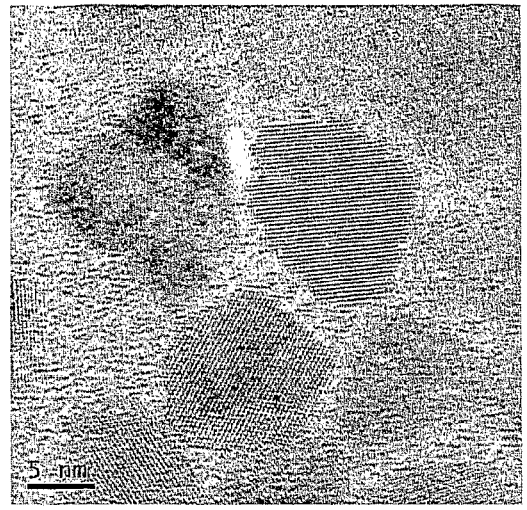
Fig. 17A                Fig. 17B
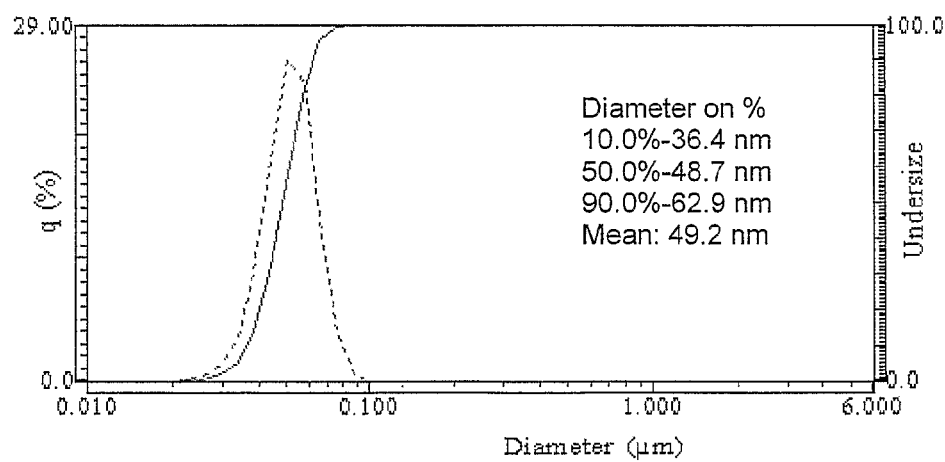
Diameter on %
10.0%-36.4 nm
50.0%-48.7 nm
90.0%-62.9 nm
Mean: 49.2 nm
Fig. 18

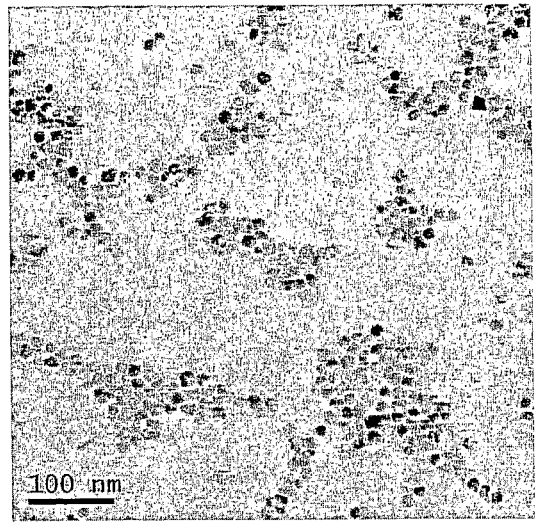 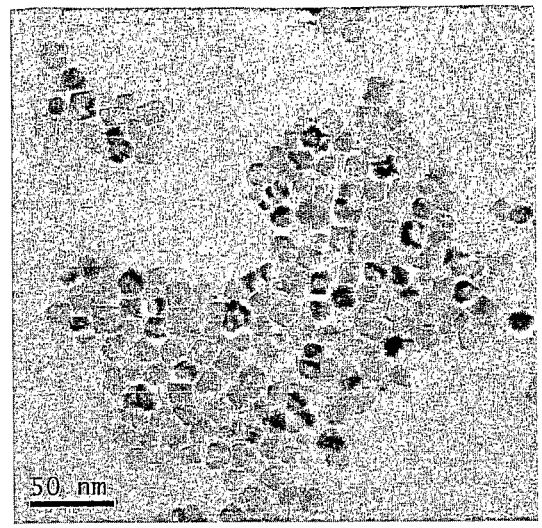
Fig. 19A  Fig. 19B
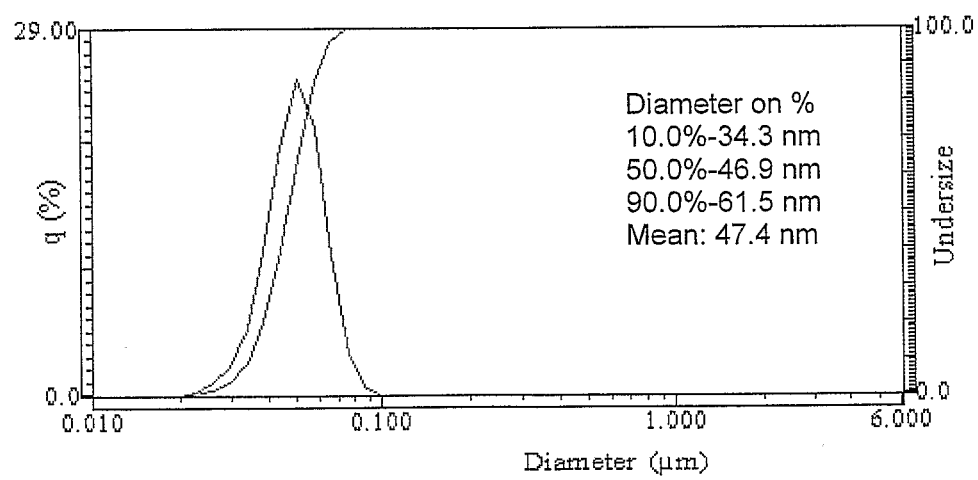
Fig. 20

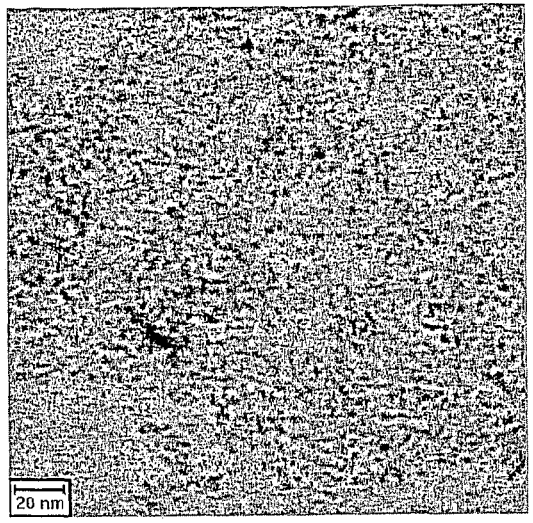 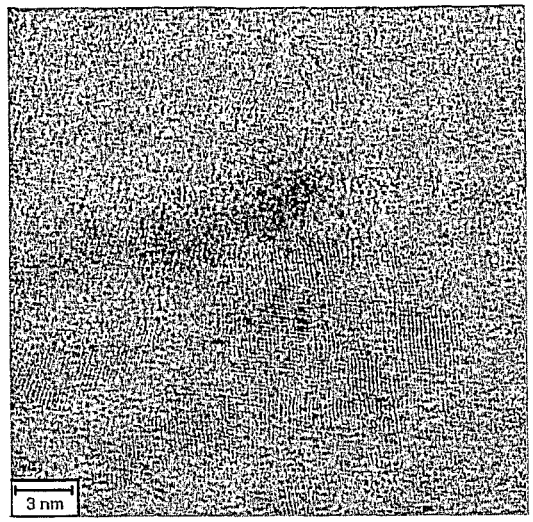
Fig. 24A  Fig. 24B
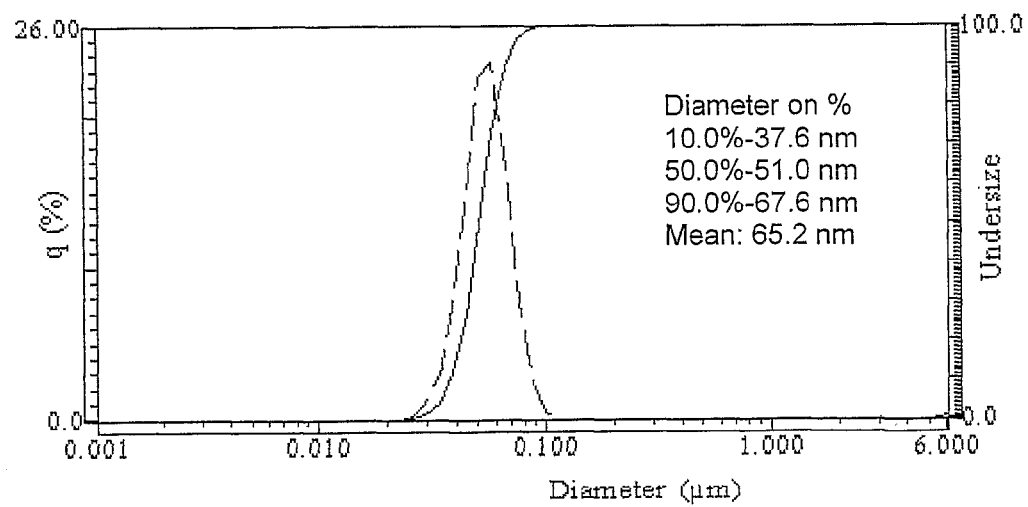
Fig. 25

PROCESS OF MAKING METAL CHALCOGENIDE PARTICLES

TECHNICAL FIELD

The present invention generally relates to a process of making metal chalcogenide particles.

BACKGROUND

In recent times, nano-sized metal chalcogenides materials have been the subject of significant research due to their potential applications as biological markers, nonlinear optical materials, luminescent devices, photodetectors, catalysts, chemical sensors and in highly effective UV-protective coatings, etc. One known method to prepare metal chalcogenide nanomaterials involves reaction in a confined medium such as microemulsion or polymer matrix whereby difficulty has been encountered in producing particles of uniform sizes.

Although a large variety of synthesis approaches have been reported for the preparation of crystalline metal chalcogenides, the large-scale synthesis or mass production of nano-sized metal chalcogenides is still a challenge. Metal chalcogenides can be prepared using a variety of wet-chemical methods including sol-gel, co-precipitation, and hydrothermal synthesis.

The extensively applied sol-gel or co-precipitation procedures are based on the hydrolysis and condensation of metal halides or metal alkoxides as precursors in aqueous solution. However, these methods suffer some major drawbacks. For example, the as-synthesized particles are amorphous and subsequent heat treatment is necessary to induce crystallization. However, this additional step results in alteration, mainly particle growth, or even in destruction of the particle morphology. Further disadvantages of aqueous systems are reaction parameters that are difficult to control, such as fast hydrolysis rate of the metal alkoxides, pH, method of mixing, rate of oxidation or sulfuration and especially the nature and concentration of anions. Also, high temperatures (higher than 500° C.) are required to calcine or hydrothermally treat the intermediate to obtain crystalline metal chalcogenides. This has a negative effect on the finely divided nature since the particles are subjected during this treatment to form μm-sized aggregates which can be broken down only incompletely to the primary particles by grinding.

Another problem that plagues some of the known processes is the poor physical stability of the nanoparticles in dispersion medium that are formed. In these processes, the chemical reactions that lead to the precipitation of the metal chalcogenides particle inevitably result in the formation of by-products. Insufficient removal of the by-products adversely affects the monodispersibility of the nanoparticles in medium, which results in agglomerations of impure metal chalcogenide particles being formed. Furthermore, even when pure metal chalcogenide particles have been formed, the by-products can be difficult to remove. In light of the aforementioned problem of poor dispersibility of metal chalcogenide particles, improvisations of current synthesis methods have been carried out to enhance the physical stability of the metal chalcogenide particles. However, the solid loading percentages of substantially stable metal chalcogenide particles suspensions obtained by these methods are far from ideal, typically at a solid loading percentage of less than 5%. The low solid loading percentage of the suspensions translates to storage inefficiency for the particles suspensions.

There is a need to provide a process of making metal chalcogenide particles that overcomes, or at least ameliorate, one or more of the disadvantages described above.

There is a need to provide a process of making metal chalcogenide particles that is able to separate any by-products from metal chalcogenide particles that are substantially free of by-products.

There is a need to provide highly concentrated substantially monodispersed metal chalcogenides nanoparticle dispersion that overcomes, or at least ameliorates, one or more of the disadvantages described above.

SUMMARY

According to a first aspect, there is provided a process of making metal chalcogenide particles, the process comprising the steps of:

reacting a metal salt solution with a precipitant solution under conditions to form metal chalcogenide particles and by-product thereof;

coating said metal chalcogenide particles with a surfactant; and separating the surfactant coated chalcogenide particles from the by-product to obtain said metal chalcogenide particles substantially free of said by-product.

Advantageously, the by-products and metal chalcogenide particles are efficiently removed from each other due to the selection of conditions in said reacting step and the surfactant coating applied to the formed metal chalcogenide particles which are efficiently separated from each other. Separation of the metal chalcogenide particles from the by-product may be by washing or via liquid-liquid phase transfer.

In one embodiment, the separating step comprises the step of:

separating the metal chalcogenide particles from the by-product using liquid-liquid phase transfer in which one liquid is an aqueous phase and the other liquid is an organic phase, wherein the aqueous phase and organic phase are immiscible with each other.

In one embodiment wherein separating is undertaken in a liquid-liquid phase transfer, the metal chalcogenide particles report to the organic phase while the by-product reports to the aqueous phase.

In one embodiment, there is provided a process of making metal chalcogenide particles according to the first aspect, wherein the reacting step is undertaken at a temperature of less than about 100 degrees Celsius. Advantageously, this reduces the production cost and mitigates the rate of equipment deterioration as a result of high temperatures.

In another embodiment, there is provided a process of making metal chalcogenide particles according to the first aspect, wherein the surfactant coated chalcogenide particles report to an organic phase medium. Advantageously, this allows the desired surfactant coated chalcogenide particles to be phase separated from the byproducts which are ionic in nature, to thereby form a monodispersion in said organic phase of said metal chalcogenide particles. More advantageously, the surfactant coated chalcogenide particles that are substantially monodispersed in the organic phase medium are substantially free from the destabilizing ionic byproducts.

Advantageously, the surfactant may aid in altering the surface property of the metal chalcogenide particles such that the surfactant coated metal chalcogenide particles are relatively less agglomerated or substantially not agglomerated when compared to metal chalcogenide particles that are not coated with the surfactant.

In another embodiment, there is provided a process according to the first aspect, wherein the surfactant coated metal chalcogenide particles are separated from the byproducts which are ionic in nature by washing the byproducts out. For example, another solvent may be added to the surfactant coated metal chalcogenide suspension to thereby dissolve the byproduct in the solvent and to allow the metal chalcogenide particles to settle down. At least a portion of the medium/solvent where the byproduct ions are dissolved in are removed from the metal chalcogenide particles. Advantageously, this allows the desired surfactant coated chalcogenide particles to be separated from the byproducts to thereby form a monodispersion of said metal chalcogenide particles in a polar medium.

In another embodiment, there is provided a process according to the first aspect, wherein the surfactant is selected such that a monodispersion of said metal chalcogenide particles is formed. Advantageously, the solid content of said monodispersion is at least 5% by weight without substantial agglomeration of the chalcogenide particles. More advantageously, the solid content of said monodispersion is at least 25% by weight, or at least 30% by weight, or at least 50% by weight, or at least 70% by weight. Therefore, the disclosed process produces metal chalcogenide monodispersion which have high particle loading.

In another embodiment, there is provided a process according to the first aspect further comprising the step of ageing said surfactant coated particles before said separating step. Advantageously, said ageing step ensures the formation of substantially crystalline chalcogenide particles.

According to a second aspect, there is provided a process of making metal oxide particles comprising the steps of:
reacting a metal salt solution with a precipitant solution in an aqueous medium phase at a pH of at least about 7.01 and at a temperature in the range of about 5 to about 100 degrees Celsius to form metal oxide particles and by-product thereof;
coating said metal oxide particles with an alkali metal organic surfactant, said surfactant being selected such that the surfactant coated metal oxide particles have a higher affinity for an organic medium phase relative to an aqueous medium phase;
introducing an organic medium to create the organic medium phase and the aqueous medium phase which are immiscible with each other, wherein the surfactant coated metal oxide particles report to the organic medium phase to produce a metal oxide monodispersion therein having at least 10% by weight solids, while the byproducts remain in said aqueous medium phase; and
separating the monodispersion of metal oxide particles from said aqueous medium phase to obtain said metal oxide particles substantially free of said by-product.

According to a third aspect, there is provided a process of making metal oxide particles comprising the steps of:
reacting a metal salt solution with a precipitant solution in an aqueous medium phase at a pH of at least about 7 and at a temperature in the range of about 5 to about 100 degrees Celsius to form metal oxide particles and by-product thereof;
coating said metal oxide particles with a surfactant;
adding an aqueous medium to said metal oxide particles and by-products to substantially dissolve said by-products; and
removing the surfactant coated metal oxide particles from said aqueous medium.

The surfactant in coating step may be represented by the formula A-B where the A group is capable of attaching to the surface of a metal oxide particle, and where B is a compatibilizing group. The A group can be attached to the surface by adsorption, formation of an ionic bond, formation of covalent bond, or a combination thereof. The group B can be reactive or nonreactive and can be polar or non-polar.

In one embodiment, more than one type of surfactant may be used. Here, the metal oxide particles may be partially coated with a first surfactant. The surfactant coated metal oxide particles may be further treated to at least partially exchange, or replace, the first surfactant with a second surfactant.

In one embodiment, the surfactant coated metal oxide particles are further treated to at least partially remove the byproducts formed during the reaction step. The byproducts are often salts formed from the anion of metal salt and cation of precipitant.

According to a fourth aspect, there is provided a nano-sized metal chalcogenide particle made in the process according to the first aspect. Advantageously, said nano-sized metal chalcogenide particles made in the process according to the first aspect have a narrow particle size distribution.

According to a fifth aspect, there is provided a monodispersion of metal chalcogenide particles produced in a method comprising the steps of:
reacting a metal salt solution in an aqueous medium phase with a precipitant solution under conditions to form metal chalcogenide particles and by-product thereof;
coating said metal chalcogenide particles with a surfactant; and
introducing an organic medium to create an organic medium phase which is immiscible with the aqueous medium phase, wherein the surfactant coated metal chalcogenide particles report to the organic medium phase to produce the metal chalcogenide monodispersion therein having at least 10% by weight particles, while the byproducts remain in said aqueous medium phase.

Advantageously, the stability of the monodispersion can be maintained at room temperature and atmospheric pressure for at least more than 1 month without substantial agglomeration of said particles.

According to a sixth aspect, there is provided a monodispersion of metal chalcogenide particles produced in a method comprising the steps of:
reacting a metal salt aqueous solution with a precipitant aqueous solution under conditions to form metal chalcogenide particles and by-product thereof;
coating said metal chalcogenide particles with a surfactant;
adding a polar medium to said metal chalcogenide particles and by-products to substantially dissolve said by-products; and
separating the surfactant coated metal oxide particles from said byproducts which are ionic in nature to thereby obtain said metal chalcogenide particles substantially free of by-products.

Advantageously, the stability of the monodispersion can be maintained at room temperature and atmospheric pressure for at least more than 1 month without substantial agglomeration of said particles.

According to a seventh aspect, there is provided a monodispersion of metal chalcogenide particles, wherein the average particle size of the metal chalcogenide particles in dispersion is between about 2 nm to about 50 nm.

In one embodiment, there is provided a mono-dispersion of metal chalcogenide particles as defined in the fifth aspect and the sixth aspect, wherein the metal chalcogenide particles have a narrow particle size distribution that is defined by a steepness ratio of less than about 3.

According to an eighth aspect, there is provided a monodispersion of metal chalcogenide particles wherein the average particle size of the metal chalcogenide particles is between about 2 nm to about 50 nm, the solids content is at least about 5% and the chalcogenide particles have a narrow particle size distribution that is defined by a steepness ratio of less than about 3.

DEFINITIONS

The following words and terms used herein shall have the meaning indicated:

The term "chalcogen" is to be interpreted broadly to refer to atoms of Group VIA of the Periodic Table of Elements. More particularly, the term "chalcogen" includes elements selected from the group consisting of oxygen (O), sulfur (S), selenium (Se), and tellurium (Te).

The term "chalcogenide" is to be interpreted broadly to refer to a binary or multinary compound containing at least one chalcogen and at least one electropositive element or radical.

The term "metal chalcogenide" is to be interpreted broadly to refer to a chalcogenide in which the at least one electropositive element is a metal cation.

The term "nano-sized" as used herein relates to an average particle size of less than about 1000 nm, particularly less than about 200 nm, more particularly between about 1 nm to about 100 nm.

The term "metal salt" is to be interpreted broadly to refer to a compound comprised of at least one anion and at least one cation. The anions and cations of the metal salt may be either simple (monatomic) ions such as $Na^+$, $Ag^+$, $Cu^+$, $Zn^{2+}$, $Ca^{2+}$, $Fe^{2+}$, $Cu^{2+}Fe^{3+}$, $Ce^{3+}$, $Al^{3+}$, $Ce^{4+}$, $Cl^-$, or complex (polyatomic) ions such as $CH_3COO^-$, $NO_3^{2-}$, $SO_4^{2-}$. At least one of the cations in the metal salt is a metal.

The term "metal" as used herein, is to be interpreted broadly to include all metals, including, for example, semi-metals, alkali metals, alkaline earth metals, transition metals and metals selected from the main groups of the Periodic Table of the Elements.

The term "metal salt solution" is to be interpreted broadly to refer to a metal salt dissolved in a solvent, such as an aqueous solvent, or an organic solvent (i.e. ethanol), or mixture of aqueous and organic solvents, or a mixture of organic solvents.

The term "precipitant solution", as used herein, is to be interpreted broadly to include any solute dissolved in a solvent that, when added to a metal salt solution, causes a precipitate to form or crystals to grow. The precipitant may include alkaline solutions such as an alkaline base, more particularly an oxygen-containing base or a chalcogen solution such as an alkali metal chalcogen (ie sodium sulfide ($Na_2S$) or an alkaline earth metal chalcogen (CaS, BeTe)).

The term "oxygen-containing base" is to be interpreted broadly to include any molecule or ion that contains an oxygen atom which can form a bond with a metal ion by donating a pair of electrons. Exemplary oxygen-containing bases include alkali metal hydroxides (ie NaOH, LiOH, KOH), alkaline earth metal hydroxides (ie $Ca(OH)_2$), an ammonia solution (ie $NH_4OH$), alkali metal carbonates (ie $Na_2CO_3$, $K_2CO_3$), alkali hydrogen carbonates (ie $NaHCO_3$, $KHCO_3$), organic base (ie $(CH_3)_4NOH$) or a mixture thereof.

The term "narrow particle size distribution", as used herein, is to be interpreted broadly to refer to a steepness ratio, as measured on a SediGraph, of the precipitate particles being less than about 3. The size distribution of the precipitate particles in a given composition may be represented on a SediGraph which plots cumulative mass percent as a function of particle size. Where cumulative mass percent is the percent, by weight, of a distribution having a particle size of less than or equal to a given value and where particle size is the diameter of an equivalent spherical particle. The mean particle size in a distribution is the size in nanometers of the precipitate particles at the 50% point on the SediGraph for that distribution. The width of the particle size distribution of a given composition can be characterized using a steepness ratio. As used herein, the "steepness ratio" is defined as the average diameter of the particles in the ninetieth mass percentile ($d_{90}$) divided by the average diameter of the particles in the tenth mass percentile ($d_{10}$).

The term "surfactant", as used herein, is to be interpreted broadly to relate to any composition that is capable of altering surface tension between a liquid and any precipitated particles suspended in the liquid. Suitable surfactants are taught in *McCutcheon's Emulsifiers & Detergents*, at pages 287-310 of the *North American Edition* (1994), and in *McCutcheon's Emulsifiers & Detergents*, at pages 257-278 and 280 of the *International Edition* (1994), both published by MC Publishing Co. (McCutcheon Division) of Glen Rock, N.J.

The terms "ageing" or "aging" are to be interpreted broadly to refer to maintaining a suspension of precipitate particles under conditions (ie such as temperature, pressure, pH value and agitation rate) for a period of time to allow the precipitate particles to form a substantially crystalline structure. The crystalline structure of the precipitate particles may be formed after fast nucleation or by at least partial dissolving of the precipitate particles and re-crystallization of the dissolved precipitate particles on the undissolved precipitates particles to form larger sized precipitate particles.

The term "liquid-liquid phase transfer" is to be interpreted broadly to include the preferential movement of solutes, residues, or any matter of interest into one of an immiscible pair of liquid phases.

The term "non-polar solvent" is to be interpreted broadly to include an organic liquid in which the positive and negative charges substantially coincide. Thus, a non-polar solvent does not ionize or impart electrical conductivity. Exemplary non-polar solvents include t-butyl methyl ether, methyl ether, and other ethers of lower alkyl groups; aliphatic and aromatic hydrocarbons, such as hexane, octane, cyclohexane, benzene, decane, toluene, and the like; symmetrical halocarbons, such as carbon tetrachloride; petroleum ether; and the like. Mixtures of non-polar liquids can be used.

The term "polar solvent", which is contrary to "non-polar solvent", is to be interpreted broadly to include a liquid in which the positive and negative charge does not coincide. Thus, a polar solvent ionize or impart electrical conductivity. Normally, a solvent's polarity is determined roughly by the dielectric constant of the solvent. Solvent with a dielectric constant more than 15 is considered a polar solvent. Exemplary polar solvents include water, alcohols such as methanols, ethanols, propanols; ketones such as acetones and methyl ethyl ketones; epoxides; and ethyl acetate. Mixtures of polar liquids can be used.

The term "aqueous medium" as used herein, is to be interpreted broadly to include any medium which comprises water, optionally in admixture with additional solvents such as organic polar solvent. Exemplary organic polar solvents are alcohols, amides, ketones, epoxides and mixtures thereof. Typically, the organic polar solvents have a relatively low number of carbon atoms, such as about 1 to about 10 carbon atoms, or 1 to 6 carbon atoms or 1 to 4 carbon atoms.

The term "monodispersion" as used herein, in conjunction with metal chalcogenide particles, is to be interpreted broadly to refer to an index of dispersion degree of metal chalcogenide particles in a liquid medium. In general, the "index of dispersion degree" is defined as the average particle size of the secondary (or aggregated) particles (which is normally analyzed by dynamic light scattering (DLS) ($d_{DLS}$)) divided by the average primary particle size of the particles (which is normally analyzed by transmission electron microscope (TEM) ($d_{TEM}$)). Therefore, the smaller the index of dispersion degree, the closer the dispersion is to a monodispersion. Typically, a monodispersion may have an index of dispersion degree of less than 7 and no less than 1. Generally, the term "monodispersion" means that the particles loaded in the liquid medium do not substantially agglomerate or clump together with other particles but remain substantially dispersed in the liquid medium.

The word "substantially" does not exclude "completely" e.g. a composition which is "substantially free" from Y may be completely free from Y. Where necessary, the word "substantially" may be omitted from the definition of the invention.

Unless specified otherwise, the terms "comprising" and "comprise", and grammatical variants thereof, are intended to represent "open" or "inclusive" language such that they include recited elements but also permit inclusion of additional, unrecited elements.

As used herein, the term "about", in the context of concentrations of components of the formulations, typically means +/−5% of the stated value, more typically +/−4% of the stated value, more typically +/−3% of the stated value, more typically, +/−2% of the stated value, even more typically +/−1% of the stated value, and even more typically +/−0.5% of the stated value.

Throughout this disclosure, certain embodiments may be disclosed in a range format. It should be understood that the description in range format is merely for convenience and brevity and should not be construed as an inflexible limitation on the scope of the disclosed ranges. Accordingly, the description of a range should be considered to have specifically disclosed all the possible sub-ranges as well as individual numerical values within that range. For example, description of a range such as from 1 to 6 should be considered to have specifically disclosed sub-ranges such as from 1 to 3, from 1 to 4, froth 1 to 5, from 2 to 4, from 2 to 6, from 3 to 6 etc., as well as individual numbers within that range, for example, 1, 2, 3, 4, 5, and 6. This applies regardless of the breadth of the range.

DETAILED DISCLOSURE OF EMBODIMENTS

Exemplary, non-limiting embodiments of a process of making metal chalcogenide particles are disclosed. The process comprising the steps of:

reacting a metal salt solution with a precipitant solution under conditions to form metal chalcogenide particles and by-product thereof;

coating said metal chalcogenide particles with a surfactant; and separating the surfactant coated chalcogenide particles from the by-product to obtain said metal chalcogenide particles substantially free of said by-product.

The metal salt solution may comprise compounds that may be completely or partially soluble in a chosen solvent. The metal salt solution may be filtered to remove any undissolved metal salt compounds. The metal salt compounds used in the process may be completely soluble at the reaction temperature of said process. The metal salt compounds used in the process may be completely soluble at room temperature and atmospheric pressure.

The metal salt may be selected from the group consisting of a metal acetate salt, a metal halide salt, a metal nitrate salt, a metal phosphate salt, a metal sulphate salt, a metal chlorate salt, a metal borate salt, a metal iodate salt, a metal carbonate salt, a metal benzoate salt, a metal perchlorate salt, a metal tartrate salt, a metal formate salt, a metal gluconate salt, a metal lactate salt, a metal laurate salt, a metal malate salt, a metal perborate salt, a metal sulfamate salt, hydrates and mixtures thereof.

The metal of the metal salt solution may be selected from the group consisting of alkali metals, alkaline earth metals, metals selected from the transition metals and metals selected from the main group of the Periodic Table of the Elements. Exemplary metals of the metal salt may include, but are not limited to, Mg, Ca, Sr, Ba, Ag, Zn, Fe, Cu, Co, Al, Ce, Sn, Zr, Nb, Ti and Cr.

In one embodiment, the precipitant solution may be a base solution. The base solution may be an oxygen-containing base solution. The oxygen-containing base solution may be selected from the group consisting of alkali metal hydroxides, alkali metal carbonates, alkaline earth metal hydroxides, alkaline earth metal carbonates, alkaline earth metal hydrogen carbonates, organic base and mixtures thereof. Exemplary oxygen-containing bases are solutions of LiOH, NaOH, KOH, $NH_3 \cdot H_2O$, $Be(OH)_2$, $Mg(OH)_2$, $Ca(OH)_2$, $Li_2CO_3$, $Na_2CO_3$, $NaHCO_3$, $K_2CO_3$, $KHCO_3$, $(CH_3)_4NOH$ or mixtures thereof. It is to be appreciated that the base solution may be used to control the pH during the reacting step. This may substantially minimize the need to stop the reaction half-way in order to adjust the pH to a desired value.

The base solution can be formed by dissolving a base (ie such as NaOH or KOH) solid in a solvent. The solvent may include water, an organic liquid (ie such as alcohol) or mixtures thereof.

In one embodiment, the precipitant solution comprises a chalcogenide salt solution selected from the group consisting of an alkali metal chalcogenide salt, and an alkaline earth metal chalcogenide salt. Anions of the chalcogenide salt include sulfides, $HS^-$, $SeO_3^{2-}$, $TeO_3^{2-}$, hydrates thereof or mixtures thereof. Exemplary chalcogenide salt solutions include $Li_2S$, $Na_2S$, $K_2S$, $Li_2Se$, $Na_2Se$, CaS, CaSe, CaTe $Na_2SeO_3$, $K_2SeO_3$, $Na_2TeO_3$, $K_2TeO_3$, hydrates thereof or mixtures thereof.

The metal salt solution during said reacting step may be in molar excess relative to a stoichiometric amount of the precipitant solution. This results in an excess of metal cation that may aid in the creation of bonds with surfactant at the surface of metal chalcogenide particles and help to form a monodispersion of metal chalcogenide, such as metal oxide, particles that have a substantially high concentration.

The monodispersion of metal chalcogenide may be defined as having an index of dispersion degree of less than about 7, less than about 5, less than about 3, less than about 2 and no less than about 1.

The reacting step may be undertaken in an open chamber or an enclosed chamber. The reacting step may be undertaken at a temperature of less than or about 100 degrees Celsius. The reacting step may be undertaken at a temperature in the range of about 5 to about 100 degrees Celsius. The reacting step may be undertaken at a temperature in the range of about 50 to about 95 degrees Celsius or about 60 to about 85 degree Celsius. The use of temperature in the above range may accelerate the reaction rate and hence reduce the reaction time. This may aid in the creation of more metal chalcogenide nuclei during the nucleation stage and hence, aid in the formation of a monodispersion of metal chalcogenide particles that have an average particle size of less than 100 nm. The reacting step may be undertaken at a pressure in the range of about 1 atm to about 2 atm. In one embodiment, the reacting step is undertaken at atmospheric pressure.

The reacting step may be undertaken for a time duration of less than about 90 minutes. In one embodiment, the time required for the reacting step is about 60 minutes or less. In another embodiment, the time required for the reacting step is less than about 10 minutes. In a further embodiment, the time required for the reacting step is less than about 5 minutes. In yet another embodiment, the time required for the reacting step is less than about 1 minute. It is to be appreciated that the surfactant may be added after the metal chalcogenide particles have been substantially formed for the surfactant to bind or cap the particles effectively.

The reacting step may be undertaken in non-acidic conditions. The reacting step may be undertaken in substantially neutral or substantially alkaline conditions. In one embodiment, the reacting step is undertaken in substantially alkaline conditions. In another embodiment, the reacting step is undertaken at a pH in the range of at least about 7.0 or at least about 8.5 or at least about 10. In another embodiment, the reacting step is undertaken at a pH in the range of about 7.2 to about 9.0. It is to be appreciated that an alkaline condition may aid in the formation of compounds that are intermediate compounds of the final metal chalcogenide particles. This may aid in promoting complete capping or binding between the surfactant and the metal chalcogenide particles such that a monodispersion of metal chalcogenide particles at high concentration is formed. In a further embodiment, particularly for those metal chalcogenides not including metal oxides, the reacting step is undertaken at a pH of about 7.

The reacting step may be undertaken in a substantially polar phase. The polar phase may be an aqueous medium phase. The aqueous medium may be comprised of at least one of water, alcohols, amides, ketones, epoxides or mixtures thereof. The alcohol may be methanol, ethanol, propanol, isopropanol or n-propanol. Without being bound by theory, it is thought that the presence of a polar organic solvent, such as an alcohol, in the aqueous medium may aid in at least partially inhibiting growth of chalcogenide crystals during the reacting step. This may aid in restricting the size of the chalcogenide crystals such that it is within a desired value, preferably within the nano-sized range.

The metal chalcogenide particles may be surface coated or modified to improve compatibility with an organic matrix material such as a polymeric material. The type of solvent used in the separating step may determine the compatibility of the metal chalcogenide product with the organic matrix material to form the end-product. For example, if an organic solvent is used in the separating step, the polymeric material may include, but is not limited to, a polystyrene, a polymethyl methacrylate, a polycarbonate, a polyurethane, and the like thereof. If a polar solvent is used in the separating step, the polymeric material may include, but is not limited to, a polyvinyl acetate, a polyvinyl butyral, and the like thereof.

The coating or modifying step may comprise the step of selecting the surfactant from the group consisting of: anionic surfactants, cationic surfactants, non-ionic surfactants, polymeric surfactants and mixtures thereof.

The surfactant may be represented by the formula A-B where the A group is capable of attaching to the surface of a metal oxide particle, and where B is a compatibilizing group. The A group can be attached to the surface by adsorption, formation of an ionic bond, formation of covalent bond, or a combination thereof. The group B can be reactive or nonreactive and can be polar or non-polar. Exemplary surfactants are silane coupling agents, which include, but are not limited to, γ-Aminopropyltriethoxy silane, γ-Glycidoxypropyltrimethoxy silane, γ-Methacryloxypropyltrimemethoxy silane, γ-Mercaptopropyltrimethoxy silane, γ-Aminoethyl-aminopropyltrimethoxy silane, Bis(triethoxysilpropyl) tetrasulfide, N-(β-aminoethyl)-γ-aminopropyl methyl dimethoxyl silane, N-(β-aminoethyl)-(γ-aminopropyl)-trimethoxy silane, γ-Aminoethyl-aminopropyltrimethoxy silane, hexadecyltrimethoxysilane and combinations thereof.

Non-silane surface modifying agents reactive and compatible with organic matrix material include, for example, sodium dodecyl-sulfate, sodium lauryl sulfate, sodium laurate, sodium oleate, sodium naphthenate, sodium stearate, sodium abietate, sodium octoate, sodium linoleate, sodium resiante, sodium 2-thylhexoate, sodium ricinoleate, sodium ethylacetoacetate, dioctylsodium sulphosuccinate, TWEEN® (polyethylene sorbitan monooleate), SPAN 80® (sorbitan monooleate), SPAN 85® (sorbitan trioleate), PLURONIC® (Ethylene Oxide/Propylene Oxide block copolymer), polyoxyethylene fatty acid esters, poly(vinylpyrrolidone), polyoxyethylene alcohol, polyethylene glycol, monodiglyceride, benzalkonium chloride, bis-2-hydroxyethyl oleyl amine, hydroxypropyl cellulose, hydroxypropyl methylcellulose, maltose, sugar, ethylene glycol, arylic acid, methacrylic acid, beta-carboxyethyl acrylate, Tetraethyl orthosilicate, and mixtures thereof.

In one embodiment, the surfactant is sugar selected from the group consisting of monosaccharides such as glucose, fructose, galactose, xylose and ribose; disaccharides such as sucrose, lactose, maltose, trehalose and cellobiose; oligosaccharides such as fructo-oligosaccharides, inulin, galactooligosaccharides and mannan-oligosaccharides; and polysaccharides such as glycogen, starch, cellulose, chitin, inulin, dextrin and glucan.

The surfactant may be added to the reaction mixture during the reacting step. The surfactant may be added to the reaction mixture after the reacting step.

Particularly preferred surfactants which may be used to coat chalcogenide particles and inhibit chalcogenide crystal growth are silane coupling agents, alkali metal oleates, alkali metal naphthenates, alkali metal stearates, alkali metal abietates, alkali metal octoates, alkali metal linoleates and alkali metal resiantes.

The coating step may comprise the step of selecting the concentration of the surfactant based on the whole solution in the crystal growth zone from the group consisting of: about 0.01% to about 10%; about 0.01% to about 5%; about 0.01% to about 1%; about 0.01% to about 0.5%; about 0.01% to about 0.1%; about 0.1% to about 10%; about 0.5% to about 10%; about 1% to about 10%; about 5% to about 10%; and about 0.1% to about 2% by weight of the mixture. In one embodiment, the mass concentration of the surfactant is selected from a value in the range of about 0.001 g/mL to about 0.03 g/mL.

The surfactant may bind to the metal chalcogenide particles in its supplied form or may undergo a chemical reaction such as hydrolysis before binding to metal chalcogenide particles. The binding of surfactant or the derived product of the surfactant to the metal chalcogenide particles may be reversible or irreversible. In one embodiment, the binding may be caused by intermolecular interactions selected from the group consisting of ion-ion interactions, Van der waals forces of attraction, hydrophobic interactions, dipole-dipole interactions, covalent bonding or a combination thereof. In another embodiment, the binding may result in the metal chalcogenide particles being completely or incompletely coated by the surfactant or its derivative.

The surfactant may be a metal organic salt having a polar group and an apolar group thereon. The metal organic salt may be an alkali metal salt. The anion of the metal organic salt may be an organic compound. The anion of the metal organic salt may be a fatty acid. The apolar group may occupy a substantially larger proportion of the surfactant.

The surfactant may be an organic acid metal salt. Preferably, the organic acid metal salt have the formula of $[RCOO^-]_x M^{x+}$, where R is a hydrophobic group of a saturated or unsaturated hydrocarbon having a carbon atom number of 5 to 35 or a saturated or unsaturated hydrocarbon having a carbon atom number of 7 to 32 and one or two hydroxyl radicals; M is a metal and x is the valence of the metal. In one embodiment, the surfactant is sodium oleate.

The surfactant may be a silane coupling agent having a polar group and an apolar group thereon, The silane coupling agents include, but are not limited to, alkyltrialkoxysilanes such as n-octyltrimethoxysilane, isooctyltrimethoxysilane, dodecyltrimethoxysilane, octadecyltrimethoxysilane, propyltrimethoxysilane, and hexyltrimethoxysilane; methacryloxyalkyltrialkoxysilanes or acryloxyalkyltrialkoxysilanes such as 3-methacryloxypropyltrimethoxysilane, 3-acryloxypropyltrimethoxysilane, and 3-(methacryloxy)propyltrienthoxysilane; methacryloxyalkylalkyldialkoxysilanes or acryloxyalkylalkyldialkoxysilanes such as 3-(methacryloxy)propylmethyldimethoxysilane, and 3-(acryloxypropyl)methyldimethoxysilane; methacryloxyalkyldialkylalkoxysilanes or acyrloxyalkyldialkylalkoxysilanes such as 3-(methacryloxy)propyldimethylethoxysilane; mercaproalkyltrialkoxylsilanes such as 3-mercaptopropyltrimethoxysilane; aryltrialkoxysilanes such as styrylethyltrimethoxysilane, phenyltrimethoxysilane, phenyltriethoxysilane, and p-tolyltriethoxysilane; vinyl silanes such as vinylmethyldiacetoxysilane, vinyldimethylethoxysilane, vinylmethyldiethoxysilane, vinyltrimethoxysilane, vinyltrriethoxysilane, vinyltriacetoxysilane, vinyltriisopropoxysilane, vinyltrimethoxysilane, vinyltriphenoxysilane, vinyltri-t-butoxysilane, vinyltris-isobutoxysilane, vinyltriisopropenoxysilane, and vinyltris(2-methoxyethoxy)silane; 3-glycidoxypropyltrialkoxysilane such as glycidoxypropyltrimethoxysilane; polyether silanes such as N-(3-triethoxysilylylpropyl) methoxyethoxyethoxyethyl carbamete(PEG3TES), N-(3-triethoxysilylpropyl)methoxyethoxyethoxyethyl carbamate (PEG2TES), and SILQUEST A-1230), and combinations thereof. In some embodiments, the surfactant is hexadecyltrimethoxysilane, N-(β-aminoethyl)-γ-aminopropyl methyl dimethoxyl silane, or γ-Methacryloxypropyltrimemethoxy silane.

The surfactant may aid in controlling or changing the shape of the resultant metal chalcogenide particles. For example, a metal chalcogenide particle may have a natural rod-like shape upon crystallization in the absence of a surfactant. However, when the same metal chalcogenides are made in the disclosed process in the presence of certain selected surfactants as described above and as demonstrated in the examples below, the resultant surfactant coated metal chalcogenide particle may have a pyramidal, polyhedral or spherical shape.

For certain metal chalcogenide particles, more than one type of surfactant may be used to coat the particles. Such metal chalcogenide particles may include zinc oxide particles which will be redispersed in a polar medium as the final product.

The metal chalcogenide particles may be partially coated with a first surfactant. The surfactant coated metal oxide particles may be further treated to at least partially exchange, or replace, the first surfactant with a second surfactant.

Without being bound by theory, the first surfactant may form chemical bonds with the second surfactant such that the resultant metal chalcogenide particles coated with both the first and second surfactant may be more stable due to the presence of polar or more hydrophilic moieties on the second surfactant. Therefore, the resultant metal chalcogenide particles may have an increased dispersibility and stability in a polar dispersion medium, as compared to metal chalcogenide particles which are not coated with a second surfactant.

The first surfactant may be selected to promote precipitation of the first surfactant coated metal chalconide particles. The precipitated particles may be separated from the ionic by-products by washing out the ionic by-products, as will be explained further below. In some embodiments, an antisolvent may be required to initiate or promote substantially complete precipitation of the first surfactant coated metal chalcogenide particles.

The first surfactant may be selected to promote chemical bonding between the metal chalcogenide particle and second surfactant. The first surfactant may alter the chemical surface properties of the metal chalcogenide particles such that the altered metal chalcogenide particles may have more hydrogen groups on the surface which promote better bonding with the second surfactant. The first surfactant may be a surfactant with a hydroxyl group that is capable of interacting with the hydroxyl group on the surface of the metal chalcogenide particle. The first surfactant may bond with the hydroxyl groups on the surface of the metal chalcogenide particle via hydrogen bonding. The first surfactant may be selected from the group consisting of sucrose, Tetraethyl orthosilicate, ethylene glycol and maltose.

The second surfactant may be selected to form strong chemical bonds, such as covalent bonds, with the hydroxyl groups on the surface of metal chalcogenide particles, or on the surface of the first surfactant. Hence, the second surfactant may aid in increasing the stability of the metal chalcogenide particles at a substantially high concentration in a dispersion medium, as compared to metal chalcogenide particles that had not been coated with a first surfactant. Furthermore, the presence of polar or hydrophilic moieties on the second surfactant may promote the dispersibility of the metal chalcogenide particles in a polar medium. The second surfactant may have a siloxane moiety that is capable of interacting with the surface of the metal chalcogenide particles or with the first surfactant coated on the metal chalcogenide particles. The siloxane moiety on the second surfactant may be capable of forming covalent bonds with the hydroxyl groups on the surface of the metal chalcogenide particles or on the first surfactant. The second surfactant may have an additional hydrophilic group that may be capable of forming hydrogen bonding with the polar molecules in the dispersion medium. The second surfactant may be a silane coupling agent, as mentioned above.

In one embodiment, an organic solvent may be added to the surfactant coated metal chalcogenide particles to result in a two-phase system comprising an organic medium phase and an aqueous medium phase that may be completely or partially immiscible with each other. The organic medium phase may be selected from the group consisting of alkanes, alkenes, ethers, acetones and aromatic solvents. In one embodiment, the organic medium phase is a non-polar organic solvent such as toluene or an alkane such as heptane, hexane, octane or decane.

The surfactant coated metal chalcogenide particles may report to the organic phase while the ionic byproducts remain in the aqueous phase. Hence, the ionic byproducts may be separated from the metal chalcogenide particles via liquid-liquid phase transfer.

The surfactant may be selected such that the surfactant coated metal chalcogenide particles have a higher affinity for the organic medium phase relative to the aqueous medium phase. The inventors have found that the use of surfactants may aid in the preferential movement of the surfactant coated metal chalcogenide particles to the organic phase. While not intending to be bound by theory, this phenomenon may be due to the alteration of the surface properties of the metal chalcogenide particles as it is coated with the surfactant such that the surfactant coated metal chalcogenide particles is relatively more hydrophobic than metal chalcogenide particles not coated with the surfactant.

In one embodiment, the surfactant is selected such that a monodispersion of the metal chalcogenide particles is formed. Preferably, the selected surfactant comprises of a stearically large organic group. The inventors have found that the coating of the surfactant on the particles may aid in the formation of a substantially monodispersed metal chalcogenide in the organic phase. Without being bound by theory, this may be due to the stearic hindrance between the organic groups of the surfactant coated metal chalcogenide particles which may aid in effectively keeping the metal chalcogenide particles from coagulating together. Furthermore, the surfactant may be selected to enable the metal chalcogenide particles to report to the organic medium phase while the ionic byproducts remain in the aqueous phase.

Alternatively, in one embodiment, an aqueous medium may be added into the surfactant coated metal chalcogenide particles to substantially dissolve ionic by-products. The metal chalcogenide particles settle to the bottom of the reaction mixture and can be separated from the by-products via centrifugation or any other physical separation process such as filtration. The by-products remain in the supernatant and are decanted after centrifugation. The metal chalcogenide particles can be re-dispersed to form a monodispersion in the polar medium. The polar medium phase may be selected from the group consisting of water, ethyl acetate, alcohols and ketone solvents. In one embodiment, the aqueous medium phase used in the washing step is a polar solvent such as $H_2O$, acetone, methanol, ethanol, propanol or mixture thereof.

The monodispersion of the metal chalcogenide particles formed may be substantially opaque or substantially translucent. In one embodiment, the monodispersion is a zinc oxide monodispersion that is substantially transparent. The light transmittance property of the monodispersion may be more than about 90%.

The solid content of the monodispersion may be at least about 5% by weight. The solid content of the monodispersion may be at least about 25% by weight. The solid content of the monodispersion may be at least about 30% by weight. The solid content of the monodispersion may be at least about 50% by weight. The solid content of the monodispersion may be at least about 70% by weight. Accordingly, a high concentration of the metal chalcogenide particles may be present in the monodispersion.

Metal chalcogenide particles made in the disclosed process may be represented by the following formula:

$M_aX_b$ wherein

M is a metal or a transition metal selected from the group consisting of group IB, group IIB, group IVA and group VIIB of the Periodic Table of Elements;

X is oxygen or a chalcogen;

a is an integer of 1, 2 or 3; and b is an integer of 1, 2, 3, 4 or 5 and wherein combinations of a and b are such that the overall charge of the compound $M_aX_b$ is zero.

In one embodiment, the metal chalcogenide made in the disclosed process may be selected from the group consisting of ZnS, ZnSe, ZnTe, PbS, PbSe, PbTe, CuS, CuSe, CuTe, CdS, CdSe, CdTe, MnS, MnSe, MnTe, $Ag_2S$, $Ag_2Se$, $Ag_2Te$, ZnO, $TiO_2$, $CeO_2$, $SnO_2$, $Fe_3O_4$, $Fe_2O_3$, $ZrO_2$, CuO, $MnO_2$, $Cu_2O$, $Al_2O_3$, $V_2O_3$, $Nb_2O_5$, NiO, $InO_3$, $HfO_2$, $Cr_2O_3$, $Ta_2O_5$, $Ga_2O_3$, $Y_2O_3$, $MoO_3$ and $Co_3O_4$.

In one embodiment, the metal chalcogenide is a metal oxide selected from the group consisting of zinc oxide, cerium (IV) oxide, iron oxide, copper oxide, zirconium oxide and titanium oxide.

The metal chalcogenide particles may have an average particle size of about 2 nm to about 100 nm; about 2 nm to about 20 nm; about 2 nm to about 50 nm; about 5 nm to about 50 nm; about 10 nm to about 100 nm and about 50 nm to about 100 nm. The metal chalcogenide particles may be completely solid, partially porous or completely porous. The metal chalcogenide particles may have a narrow particle size distribution in that the steepness ratio of the final metal chalcogenide particles in dispersion is less than about 3, or less than about 2, or less than about 1.8, or less than about 1.5 or less than about 1.3.

The process may further comprise the step of ageing the surfactant coated particles before the separating step. This may aid in the production of particles that are substantially crystalline. In one embodiment, the ageing step is undertaken for a time period of about 5 minutes to about 4 hours.

The process may comprise after the separating step, the step of washing the metal chalcogenide particles with an aqueous medium. The step of washing the metal chalcogenide particles with aqueous medium may remove any unwanted by products that may be ionic in nature that have not been completely removed in the separating step. The removal of unwanted by products may aid in increasing the stability of the monodispersion of metal chalcogenide particles.

The aqueous medium used during the washing step may be the same or may be different than that used during the reacting step. In the washing step, the aqueous medium may be comprised of at least one of water, alcohols, amides, ketones, epoxides or mixtures thereof.

In one embodiment, one or more alcohols selected from the group consisting of methanol, ethanol, propanol, isopropanol, n-propanol and mixtures thereof may be in admixture with the water. In one embodiment, the volume amount of alcohol relative to water solvent may be in the range selected from the group consisting of about 1% to about 99%; about 10% to about 99%; about 20% to about 99%; about 30% to about 99%; about 40% to about 99%; about 50% to about 99%; about 60% to about 99%; about 70% to about 99%; about 80% to about 99%; and about 90% to about 99%.

The washing aqueous medium added to the organic phase medium may be at least partially miscible with the reaction medium comprising the metal chalcogenide particles. In this embodiment, the metal chalcogenide particles in the above mixed medium may precipitate out from the mixed medium. The metal chalcogenide particles can be centrifuged and washed again with aqueous medium.

In some embodiments, it may be necessary to re-disperse the formed metal chalcogenide particles in a dispersion medium. The dispersion medium may be selected from the group consisting of water, ethyl acetate, alcohols, alkenes, ethers, ketones and aromatic solvents. The type of dispersion medium chosen may be dependent on the type of end-product required. For example, if the end-product requires the use of a polar solvent, the metal chalcogenide particles may be re-dispersed in a polar solvent. Alternatively, if the end-product requires the use of a non-polar solvent, the metal chalcogenide particles may be re-dispersed in a non-polar solvent.

A shear force may be applied to the mixture of metal salt solution and precipitant solution during the reacting step to form the metal chalcogenide particles having a narrow particle size distribution characterized in that the steepness ratio of the final precipitate suspension is less than about 3, or less than about 2, or less than about 1.9, or less than about 1.8, or less than about 1.7, or less than about 1.6, or less than about 1.5, or less than 1.3.

The process may further comprise the step of agitating the solution during the reacting step to induce the shear force. The shear force induced may have a Reynolds number in the range selected from the group consisting of 2000-200000, 5000-150000, 8000-100000. The substantially high Reynolds number may enable a high degree of mixing in said reaction zone. In one embodiment, the agitating step to induce the shear force during the reacting step may be provided by an agitator and shearing means as previously disclosed in the International Patent Application number PCT/SG02/00061, the disclosure of which is herein incorporated as reference.

BRIEF DESCRIPTION OF DRAWINGS

The accompanying drawings illustrate a disclosed embodiment and serves to explain the principles of the disclosed embodiment. It is to be understood, however, that the drawings are designed for purposes of illustration only, and not as a definition of the limits of the invention.

FIG. 2A and FIG. 2B show high resolution transmission electron microscope (HRTEM) images of monodispersed ZnO nanoparticles prepared in example 1.1 below. FIG. 2A was obtained at 50 k magnification and FIG. 2B was obtained at 500 k magnification.

FIG. 3 shows a dynamic light scattering (DLS) pattern of the monodispersed ZnO nanoparticles prepared in example 1.1 below.

FIG. 5A was obtained at 40 k magnification and FIG. 5B was obtained at 120 k magnification.

FIG. 6A was obtained at 40 k magnification and FIG. 6B was obtained at 400 k magnification.

FIG. 8A was obtained at 30 k magnification and FIG. 8B was obtained at 200 k magnification.

FIG. 10A and FIG. 10B shows HRTEM images of monodispersed ZnO nanoparticles prepared in example 1.5 below. FIG. 10A and FIG. 10B were obtained at 80 k magnification.

FIG. 11 shows a DLS pattern of monodispersed ZnO nanoparticles prepared in example 1.5 below.

FIG. 12A and FIG. 12B shows HRTEM images of monodispersed ZnO nanoparticles prepared in example 1.6 below. FIG. 12A was obtained at 50 k magnification and FIG. 12B was obtained at 80 k magnification.

FIG. 13 shows a DLS pattern of monodispersed ZnO nanoparticles prepared in example 1.6 below.

FIG. 14A and FIG. 14B show HRTEM images of monodispersed $CeO_2$ nanoparticles prepared in example 2.1 below. FIG. 14A was obtained at 30 k magnification and FIG. 14B was obtained at 500 k magnification.

FIG. 15A shows a DLS pattern of monodispersed $CeO_2$ nanoparticles prepared in example 2.1 below.

FIG. 15B shows a DLS pattern of monodispersed $CeO_2$ nanoparticles prepared in example 2.1 below that had been dried and redispersed in hexane.

FIG. 17A and FIG. 17B show HRTEM images of monodispersed $CeO_2$ nanoparticles prepared in example 2.2 below. FIG. 17A was obtained at 30 k magnification and FIG. 17B was obtained at 500 k magnification.

FIG. 18 shows a DLS pattern of monodispersed $CeO_2$ nanoparticles prepared in example 2.2 below.

FIG. 19A and FIG. 19B show HRTEM images of monodispersed $CeO_2$ nanoparticles prepared in example 2.3 below. FIG. 19A was obtained at 30 k magnification and FIG. 19B was obtained at 60 k magnification.

FIG. 20 shows a DLS pattern of monodispersed $CeO_2$ nanoparticles prepared in example 2.3 below.

FIG. 21A was obtained at 200 k magnification and FIG. 21B was obtained at 500 k magnification.

FIG. 24A and FIG. 24B show HRTEM images of monodispersed CuO nanoparticles prepared in example 4.1 below. FIG. 24A was obtained at 100 k magnification and FIG. 24B was obtained at 600 k magnification.

FIG. 25 shows a DLS pattern of monodispersed CuO nanoparticles prepared in example 4.1 below.

DETAILED DESCRIPTION OF DRAWINGS

Figure 1:
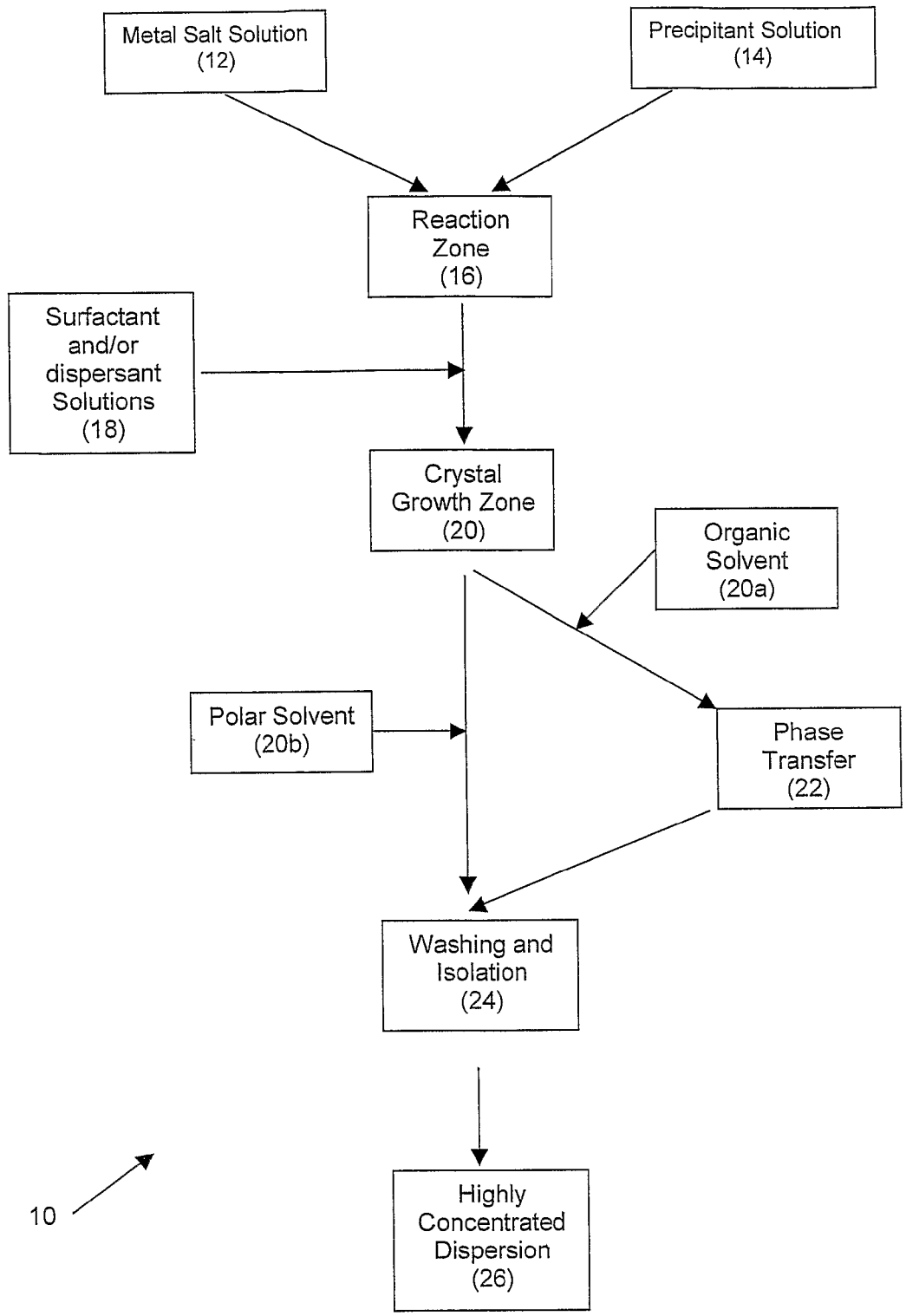
FIG. 1 is a schematic diagram of a flow chart for implementing the process for the production of metal chalcogenide particles.

Referring to FIG. 1, there is provided a process 10 for the preparation of metal chalcogenide particles. In the first step, a metal salt solution 12, such as Zinc acetate or Cerium (III) nitrate solution is mixed with a precipitant solution 14, which is alkali, such as potassium hydroxide, sodium hydroxide or ammonia solution. The chemical reaction that occurs between the metal salt solution 12 and the precipitant solution 14 is carried out in a reaction zone 16 which may be a beaker, a flask, or a tank. A shear force is applied to the mixture of metal solution 12 and precipitant solution 14 during the mixing and reacting step. The reaction zone 16 is typically maintained at a temperature of between 20 degrees Celsius to 95 degrees Celsius, at atmospheric pressure and at a pH of 7.2 to 9.0. Within the reaction zone 16, the nucleation of particles occurs.

After nucleation of the metal chalcogenide particles, a surfactant 18 such as sodium oleate, sodium abietate, sodium stearate, sodium octoate, sodium haphthenate, sodium linoleate, hexadecyltrimethoxysilane, N-(β-aminoethyl)-γ- aminopropyl methyl dimethoxyl silane, γ-Methacryloxypropyltrimemethoxy silane, sugar, ethylene glycol, maltose or mixtures thereof, is added. The reaction zone 16 subsequently progresses into the crystal growth zone 20, where capping and crystallization of the metal chalcogenide particles results. The surfactant 18 caps the metal chalcogenide particles. The metal chalcogenide particles are left to age in order for the surfactant to at least partially cap the metal chalcogenide particles and for the metal chalcogenide particles to substantially crystallize. The time in the ageing step may be in the range of about 5 minutes to about 4 hours.

In one embodiment, after the ageing step, an organic solvent 20a, such as hexane, is added to the crystal growth zone 20 comprising the metal chalcogenide particles and ionic byproducts.

For example, in a reaction to produce ZnO from $Zn(OAc)_2$ and NaOH, the byproducts may include $Zn^{2+}$, $ZnOH^+$, $Zn(OH)_2$, $ZnOH_3^-$, $Zn(OH)_4^{-2}$, $OAc^-$ and $Na^+$. The process then proceeds to the phase transfer step 22. Once the organic solvent 20a has been added, the metal chalcogenide particles appear to dissolve completely. This occurs because the surfactant coated metal chalcogenide particles move preferentially toward the organic medium phase and are suspended in a substantially monodispersed form.

An immiscible mixture of an organic phase medium and an aqueous phase medium is formed. The aqueous phase medium containing the ionic byproducts is separated from the organic phase medium by known liquid-liquid phase separation apparatus such as a separating funnel.

Alternatively, in another embodiment, after the ageing step, a polar solvent 20b is added to the crystal growth zone 20 to dissolve the ionic by-products. The metal chalcogenide particles settle to the bottom of the reaction mixture and can be separated from the by-products via centrifugation or any other physical separation process such as filtration. The by-products remain in the supernatant and are decanted after centrifugation. The metal chalcogenide particles can form a monodispersion in the polar medium.

The process may involve a washing and isolation step 24 after the separation of the by-products from the metal chalcogenide particles. During the washing and isolation step 24, an aqueous medium, such as water, alcohols, amides, ketones, epoxides or mixtures thereof is added to the organic phase medium. The addition of the aqueous medium in this step serves to remove any remaining ionic byproducts that are not removed in the separating step.

The resultant precipitate was freely dissolved in a suitable solvent to form a highly concentrated dispersion 26 that comprises the surfactant coated metal chalcogenide particles. If an organic solvent 20a was used in the separating step, the resultant precipitate was dissolved in the organic phase medium. If a polar solvent 20b was used in the separating step, the resultant precipitate was dissolved in a polar solvent, which may be the same as or different from the solvent used in the separating step.

EXAMPLES

Non-limiting examples of the invention will be further described in greater detail by reference to specific Examples, which should not be construed as in any way limiting the scope of the invention.
Chemicals:

Zinc acetate 2-hydrate, ferric chloride, and copper acetate 1-hydrate and other metal salts were purchased from GCE Laboratory Chemicals (Germany). Sodium hydroxide, potassium hydroxide, iron(II) chloride tetrahydrate, methyl ethyl ketone, ethylene glycol and ethanol were purchased from Merck & Co, Inc. of Whitehouse Station of N.J. of the United States of America (USA). Methyl alcohol, isopropyl alcohol, hexane, and toluene were purchased from Tedia of Fairfield of Ohio of the USA. Ammonia solution (25%) was purchased from Honeywell of Morristown of N.J. of the USA. Sodium oleate was purchased from VWR Prolabo of Leicestershire of the United Kingdom. Cerium nitrate hexahydrate was purchased from Tianjin Delan Fine Chemicals, China. KH570 and KH792 were purchased from Jiansu Chenguang Coincident Dose Co. Ltd. Octane was purchased from LABSCAN of Stillorgan of Dublin. Technical methyl alcohol and ethanol were purchased from Aik Moh Paints & Chemicals Pte Ltd of Singapore. Sucrose was commercially available sucrose. Ethyl acetate, maltose, Tetraethyl orthosilicate (TEOS) and technical hexane were purchased from Fisher Scientific of Pittsburg of Pa. of the USA.

Example 1

Monodispersed ZnO Nanoparticles

Example 1.1

20.95 g of Methanol (MeOH) was added to $Zn(OAc)_2.2H_2O$ (4.97 g) in a 3-necked round bottom flask (RBF). 3.18 g of concentrated NaOH aqueous solution (49 wt %) was diluted with 20.95 g of MeOH followed by mixing with $Zn(OAc)_2$ solution under vigorous stirring. The reaction temperature of the system was maintained at 62° C. 4 to 8 minutes after the NaOH solution was mixed with the $Zn(OAc)_2$ solution, 20 mL of 0.015 w/w sodium oleate aqueous solution was added to the reaction solution. White precipitate formed almost immediately after the addition of sodium oleate. The reaction solution was aged at 62° C. for 45 minutes.

20 mL of hexane was then added to the reaction solution. The white precipitate dissolved upon addition of hexane and was extracted into hexane forming a bluish solution upon stirring. The aqueous layer was removed using a separation funnel. About 30 mL of isopropyl alcohol (IPA) was added to the hexane solution and a flocculent precipitate formed. The precipitate was centrifuged and washed with MeOH and IPA. The resulted white precipitate was freely dispersed in various long chain alkyl solvents such as hexane, heptane, toluene, benzene, decane and octane or mixtures thereof, and could form transparent dispersion with high solid loading (i.e. about 30 w/v %). A mixture of octane and hexane (1:1 volume) was chosen to redispersed the ZnO nanoparticles. The ZnO nanoparticles obtained were subjected to various characterization analyses as shown below.

The ZnO nanoparticles obtained were characterized in relation to their crystal structures using the X-Ray Powder Diffraction (XRPD). The XRPD result is shown in FIG. 4.

Figure 4:
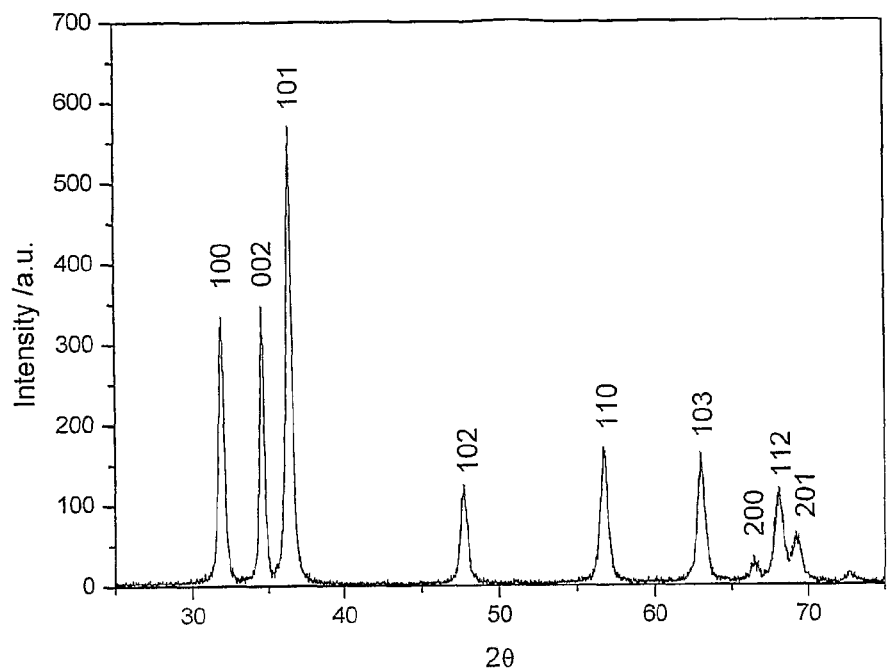
FIG. 4 shows an X-Ray Powder Diffraction (XRPD) pattern of the monodispersed ZnO nanoparticles prepared in example 1.1 below.

From FIG. 4, it was observed that the crystal structure of the ZnO nanoparticles obtained can be indexed to the hexagonal wurtzite crystalline system (JCPDS 36-1451).

The mean particle size and particle size distribution of the ZnO nanoparticles was investigated using dynamic light scattering (DLS) particle size analyzer LB-500 characterization. FIG. 3 depicts the results obtained from the DLS characterization.

From FIG. 3, it can be observed that ZnO nanoparticles with an average secondary particle size of 51.1 nm and size range of between 26 nm and 87 nm were obtained. The steepness ratio ($d_{90}/d_{10}$) of the particles is 1.67. Narrow peak width in the DLS graph also suggests that the ZnO nanoparticles are close to being monodispersed and have a narrow particle size distribution.

The primary particle size and particle shape of the ZnO nanoparticles obtained were characterized using TEM.

FIG. 2A and FIG. 2B are HRTEM image for exemplary ZnO nanoparticles obtained in this example. It can be seen from FIG. 2A and FIG. 2B that the zinc oxide nanoparticles obtained are substantially monodispersed. The particle morphology was found to be near-spherical or prismy. The primary particle size is about 12 nm. The size range is from 5 to 20 nm. The index of dispersion degree for the particles produced in this example is 4.26. Discrete specks of darker shades (ZnO nanoparticles) can be clearly observed with little or no overlapping between the darker shades, indicating that there is little or no aggregation of the particles. Moreover, it is observed that the zinc oxide nanoparticles are approximately the same size, which is indicative of a narrow size distribution of nanoparticles present in the monodispersion.

Comparative Example 1.1

20.95 g of Methanol was added to $Zn(OAc)_2 \cdot 2H_2O$ (4.97 g) in a 3-necked RBF. 3.18 g of concentrated NaOH aqueous solution (49 wt %) was diluted with 20.95 g of MeOH followed by mixing with the $Zn(OAc)_2$ solution under vigorous stirring. The reaction temperature of the system was maintained at 62° C. White precipitate formed gradually after the reaction. The reaction solution was aged at 62° C. for 45 minutes. The precipitate was centrifuged and washed with methanol. The washed white precipitate could be dispersed in water to form the ZnO nano particles dispersion or dried to form dry powder of ZnO nanoparticles.

Figure 5A:
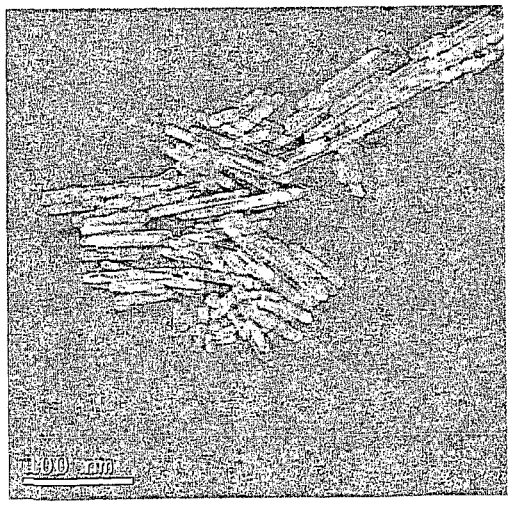
FIG. 5A and FIG. 5B show HRTEM images of monodispersed ZnO nanoparticles prepared in comparative example 1.1 below.
Figure 5B:
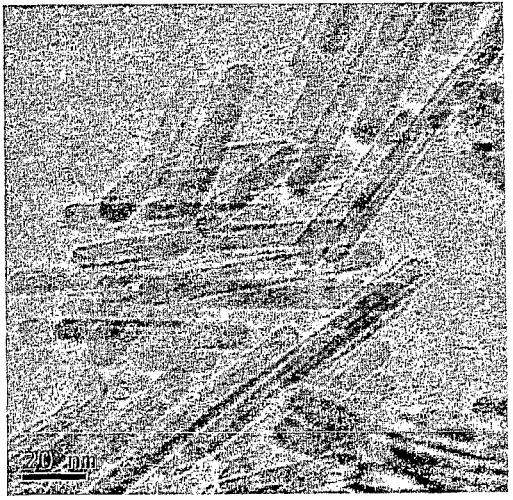

FIG. 5A and FIG. 5B are HRTEM image for exemplary ZnO nanoparticles prepared herein. It can be seen from FIG. 5A and FIG. 5B that the zinc oxide nanoparticles obtained have a rod shape. The rod-shaped ZnO nanoparticles obtained are about 8 nm in width, and about 100 nm in length.

The XRPD analysis result demonstrates that the crystalline structure of the ZnO nanoparticles synthesized in this comparative example is the same as that of the ZnO nanoparticles obtained in Example 1.1 above.

Example 1.2

ZnO monodispersed particles were prepared in accordance with the process as described in example 1.1 except that the concentration of sodium oleate solution was varied from 0.005 w/w % to 0.04 w/w %. Hexane was chosen to re-dispersed the ZnO nanoparticles.

The particle size, particle shape and particle size distribution of the particles in the dispersion formed analyzed by TEM and DLS. It is observed that the primary particle size of these samples is about 10~15 nm. The steepness ratio of the particles is about 1.5~2.0.

The XRPD analysis result demonstrates that the crystalline structure of the ZnO nanoparticles synthesized in this example is the same as that of the ZnO nanoparticles obtained in Example 1.1 above.

Example 1.3

83.7 g of MeOH was added to $Zn(OAc)_2 \cdot 2H_2O$ (19.88 g) in a beaker to form 0.85 mol/L zinc acetate solution. 12.72 g of concentrated NaOH aqueous solution (49.8 wt %) was diluted with 83.7 g of MeOH followed by mixing with the $Zn(OAc)_2$ solution under vigorous stirring. The reaction temperature of the system was maintained at 62° C. 4 minutes after the NaOH solution was mixed with the $Zn(OAc)_2$ solution, 80 mL of 0.05 mol/L sodium oleate aqueous solution was added to the reaction solution. White precipitate formed almost immediately after the addition of sodium oleate. The reaction solution was aged at 62° C. for 45 minutes.

40 mL of hexane was added to the reaction solution. The white precipitate dissolved upon addition of hexane and was extracted into hexane forming a bluish solution upon stirring. The aqueous layer was removed using a separation funnel. About 40 mL of IPA was added to the hexane solution and a flocculent precipitate formed. The precipitate was centrifuged and washed with MeOH and IPA. The resulted white precipitate was freely dispersed in various long chain alkyl solvents such as hexane, heptane, toluene, benzene, decane and octane or mixtures thereof, and could form transparent dispersion with high solid loading (i.e. 30 w/v %). The ZnO nanoparticles obtained were subjected to various characterization analyses as shown below.

The particle size, particle shape and particle size distribution of particles in hexane solution were analyzed by TEM and DLS.

Figure 6A:
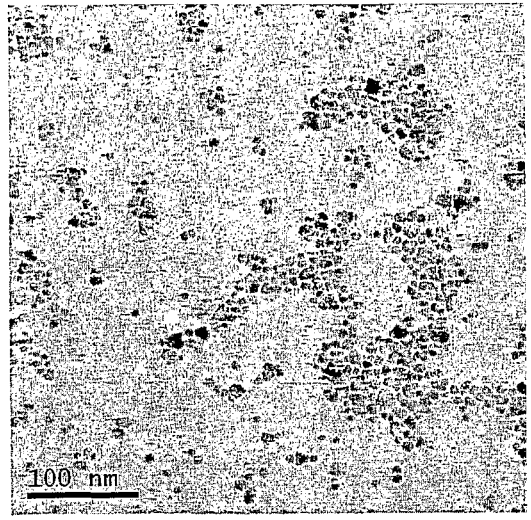
FIG. 6A and FIG. 6B HRTEM images of monodispersed ZnO nanoparticles prepared in example 1.3 below.
Figure 6B:
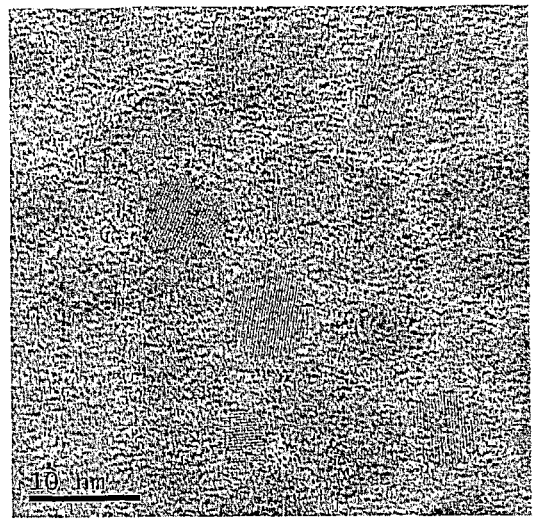

FIG. 6A and FIG. 6B are HRTEM images for exemplary ZnO nanoparticles obtained. It can be seen from FIG. 6A and FIG. 6B that the zinc oxide nanoparticles obtained herein are substantially monodispersed. The particle morphology was found to be near-spherical or prismy. The primary particle size is about 9 nm. The size range is from 6 to 18 nm. The index of dispersion degree for the particles produced in this example is 5.4. Discrete specks of darker shades (ZnO nanoparticles) can be clearly observed with little or no overlapping between the darker shades, indicating that there is little or no aggregation of the particles. Moreover, it is observed that the zinc oxide nanoparticles are approximately the same size, which is indicative of a narrow size distribution of nanoparticles present in the monodispersion.

Figure 7:
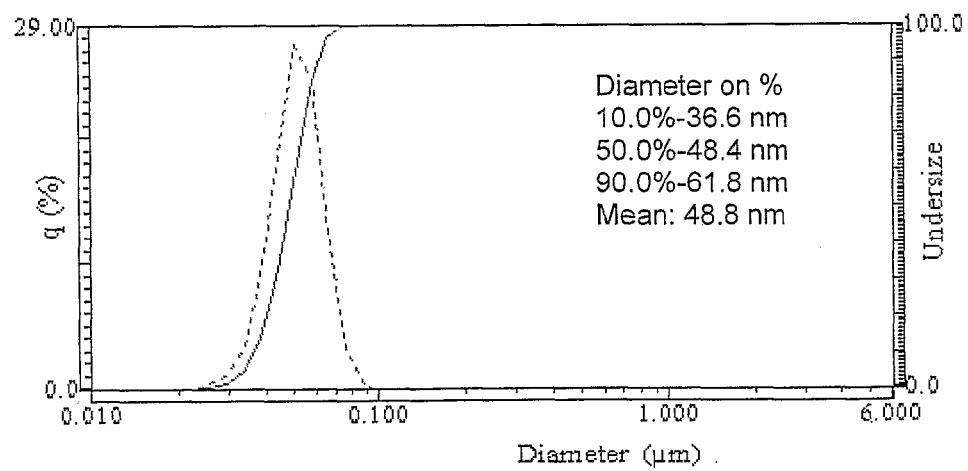
FIG. 7 shows a DLS pattern of the monodispersed ZnO nanoparticles prepared in example 1.3 below.

FIG. 7 depicts the results obtained from the DLS characterization. From FIG. 7, it can be observed that the ZnO nanoparticles obtained herein have an average secondary particle size of 48.8 nm and a size range of between 26 nm and 87 nm. The steepness ratio ($d_{90}/d_{10}$) of the particles is 1.69. The narrow peak width in the DLS graph also suggests that the ZnO nanoparticles are close to being monodispersed and have a narrow particle size distribution.

The XRPD analysis result demonstrates that the crystalline structure of the ZnO nanoparticles obtained herein is the same as that of the ZnO nanoparticles obtained in Example 1.1 above.

Example 1.4

The reactor used in this example is the molecular mixing unit which was described in detail in International Patent Application number PCT/SG02/00061.

$Zn(OAc)_2 \cdot 2H_2O$ was dissolved in MeOH to form 2 L $Zn(OAc)_2$ solution with a concentration of 0.84 mol·L$^{-1}$, Water was slowly added to the solution to aid in the complete dissolution of zinc acetate. The solution was stored in a metal salt tank and heated up to about 61° C.

2.0 L NaOH solution at a concentration of about 1.4 mol·L$^{-1}$ was prepared by dissolving hydrous NaOH in methanol and then stored in a tank and heated up to about 61° C.

The above zinc acetate solution and NaOH solution were simultaneously pumped at a fixed flow rate of 35 L·hr$^{-1}$ respectively for both solutions into the reaction zone of the molecular mixing unit. The temperature of the molecular mixing unit was held at about 62° C. during the mixing and reacting step. A precipitate having an ivory-white colour formed almost immediately and was suspended as a slurry.

The high-gravity level of the packed bed was at a fixed level of 1579 m·s$^{-2}$.

The slurry suspension flowed to the product tank for post aging process. The temperature of the product tank was maintained at about 62° C. 4 minutes and 30 seconds after the suspension aged in the production tank, 0.05 mol·L$^{-1}$ sodium oleate solution was added to the production tank under vigorous stirring. The slurry was further aged for 26 minutes.

About 600 mL hexane was added to the slurry and stirred. The white precipitate was dissolved and transferred to the hexane. The aqueous layer was discarded. Equal volume of isopropyl alcohol was added to the hexane solution to precipitate the ZnO nanoparticles. The solution was left in a fridge overnight for the nanoparticles to precipitate.

The precipitate was centrifuged and washed twice with MeOH and isopropyl alcohol to remove the impurities. The final white powder could be freely re-dispersed in various long chain alkyl solvents such as hexane, heptane, toluene, benzene, decane and octane or mixtures thereof, and could form transparent dispersion with high solid loading (i.e. ≥30 w/v %). The ZnO nanoparticles obtained were subjected to various characterization analyses as shown below.

The particle size, particle shape and particle size distribution of particles in hexane solution were analyzed by TEM and DLS.

Figure 8A:
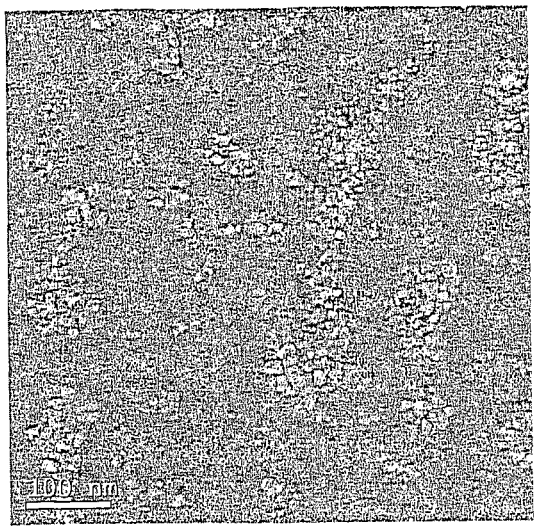
FIG. 8A and FIG. 8B shows HRTEM images of monodispersed ZnO nanoparticles prepared in example 1.4 below.
Figure 8B:
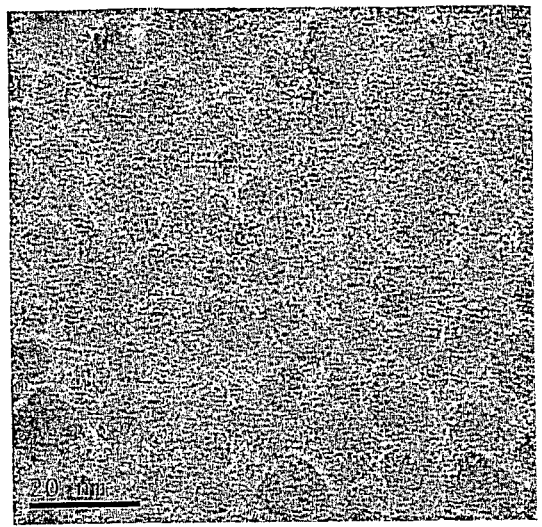

FIG. 8A and FIG. 8B are HRTEM images for exemplary ZnO nanoparticles obtained. It can be seen from FIG. 8A and FIG. 8B that the zinc oxide nanoparticles obtained herein are substantially monodispersed. The particle morphology was found to be near-spherical or prismy. The primary nanoparticle size is about 8 nm. The size range is from 5 to 15 nm. The index of dispersion degree for the particles produced in this example is 6.15. Discrete specks of darker shades (ZnO nanoparticles) can be clearly observed with little or no overlapping between the darker shades, indicating that there is little or no aggregation of the nanoparticles. Moreover, it is observed that the zinc oxide nanoparticles are approximately the same size, which is indicative of a narrow size distribution of nanoparticles present in the monodispersion.

Figure 9:
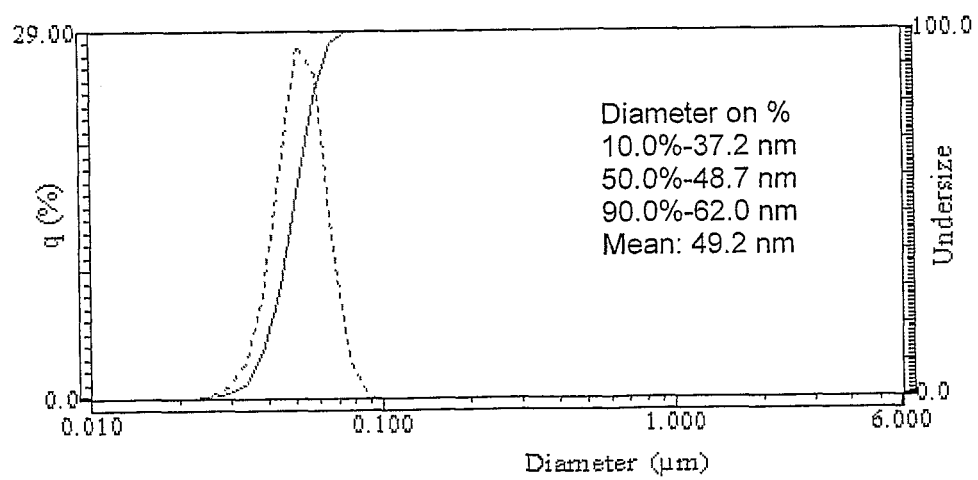
FIG. 9 shows a DLS pattern of monodispersed ZnO nanoparticles prepared in example 1.4 below.

FIG. 9 depicts the results obtained from DLS characterization. From FIG. 9, it can be observed that the ZnO nanoparticles obtained herein have an average secondary particle size of 49.2 nm and have a size range of between 30 nm to 79 nm. The steepness ratio ($d_{90}/d_{10}$) of the particles is 1.67. Narrow peak width in the DLS graph also suggests that the ZnO nanoparticles are close to being monodispersed and have a narrow particle size distribution.

The XRPD analysis result demonstrated that the crystalline structure of the ZnO nanoparticles obtained in this example is the same as that of the ZnO nanoparticles obtained in Example 1.1 above.

Example 1.5

111.45 g of MeOH was added to Zn(OAc)$_2$·2H$_2$O in a 3-necked RBF to form 0.595 mol·L$^{-1}$ Zn(OAc)$_2$ methanolic solution (1.134 L). 18.43 g of KOH was dissolved in MeOH to form 1.134 L KOH solution with a concentration of 1.01 mol·L$^{-1}$. The KOH solution was mixed with the Zn(OAc)$_2$ methanolic solution under vigorous stirring in RPF. The reaction temperature of the system was maintained at 62° C. seconds after the KOH solution was mixed with the Zn(OAc)$_2$ methanolic solution, 0.05 mol·L$^{-1}$ sodium oleate aqueous solution (0.448 L) was added to the reaction solution. White precipitate formed almost immediately after the addition of sodium oleate. The reaction solution was aged at 62° C. for 10 minutes.

300 mL of hexane was added to the reaction solution. The white precipitate dissolved upon addition of hexane and was extracted into hexane forming a bluish solution upon stirring. The aqueous layer was removed using a separation funnel. About 30 mL of IPA was added to the hexane solution and a flocculent precipitate formed. The precipitate was centrifuged and washed with MeOH and IPA. The resulted white precipitate was freely dispersed in various long chain alkyl solvents such as hexane, heptane, toluene, benzene, decane and octane or mixtures thereof, and could form transparent dispersion with high solid loading (i.e. ≥30 w/v %). Toluene was chosen to re-disperse the ZnO nanoparticles. The ZnO nanoparticles obtained were subjected to various characterization analyses as shown below.

The particle size, particle shape and particle size distribution of the ZnO nanoparticles in the toluene suspension were analyzed by TEM and DLS.

FIG. 10A and FIG. 10B are HRTEM images for exemplary ZnO nanoparticles obtained herein. It can be seen from FIG. 10A and FIG. 10B that the zinc oxide nanoparticles obtained are substantially monodispersed. The particle morphology was found to be near-spherical or prismy. The primary nanoparticle size is about 8 nm. The size range is from 6 to 14 nm. The index of dispersion degree for the particles produced in this example is 3.98. Discrete specks of darker shades (ZnO nanoparticles) can be clearly observed with little or no overlapping between the darker shades, indicating that there is little or no aggregation of the nanoparticles. Moreover, it is observed that the zinc oxide nanoparticles are approximately of the same size, which is indicative of a narrow size distribution of nanoparticles present in the monodispersion.

FIG. 11 depicts the results obtained from the DLS characterization. From FIG. 11, it can be observed that the ZnO nanoparticles have an average secondary particle size of 31.8 nm and a size range of between 20 nm to 60 nm. The steepness ratio ($d_{90}/d_{10}$) of the nanoparticles is 1.8. Narrow peak width in the DLS graph also suggests that the ZnO nanoparticles are close to being monodispersed and have a narrow particle size distribution.

The XRPD analysis result demonstrates that the crystalline structure of the ZnO nanoparticles obtained in this example is the same as that of the ZnO nanoparticles obtained in Example 1.1 above.

Example 1.6

ZnO monodispersed nanoparticles were prepared in accordance with the process as described in example 1.3 except that in the washing step, about 10 mL acetone was added to the hexane solution and the precipitate was discarded. Then, another 30 mL acetone was added to the supernatant and flocculent precipitate formed again. The resultant white precipitate was washed twice with MeOH and IPA. The ZnO nanoparticles obtained were freely dispersed in toluene.

FIG. 12A and FIG. 12B are HRTEM images for exemplary ZnO nanoparticles obtained herein. It can be seen from FIG. 12A and FIG. 12B that the primary particle size of the ZnO nanoparticles is about 7 to about 12 nm, which indicates that the zinc oxide nanoparticles obtained are substantially monodispersed and have a uniform size.

FIG. 13 depicts the results obtained from DLS characterization. The secondary average particle size and particle size distribution of the ZnO nanoparticles in the monodispersion were analyzed by DLS. From FIG. 13, the result shows that the ZnO nanoparticles have an average secondary particle size of 27.5 nm and a size range of between 20 nm to 40 nm. The steepness ratio ($d_{90}/d_{10}$=35.2/20.3) of the ZnO nanoparticles is about 1.73.

The XRPD analysis result demonstrates that the crystalline structure of the ZnO nanoparticles obtained in this example is the same as that of the ZnO nanoparticles obtained in Example 1.1 above.

Example 1.7

ZnO monodispersed particles were prepared in accordance with the process as described in example 1.1 except that the concentration of zinc acetate solution was varied from 0.5 mol/L to 1 mol/L. The ratio of [$Zn^{2+}$]/[$OH^-$] is fixed as that in example 1.1. Hexane was chosen to re-dispersed the ZnO nanoparticles.

The particle size, particle shape and particle size distribution of the nanoparticles in the monodispersion were analyzed by TEM and DLS. It is observed that the primary particle size of the ZnO nanoparticles is about 6 to 15 nm. The steepness ratio of the ZnO nanoparticles is about 1.4 to 2.0.

The XRPD analysis result demonstrates that the crystalline structure of the ZnO nanoparticles obtained in this example is the same as that of the ZnO nanoparticles obtained in Example 1.1 above.

Example 1.8

ZnO monodispersed particles were prepared in accordance with the process as described in example 1.1 except that the mole ratio of [$Zn^{2+}$]/[$OH^-$] is varied from 0.5 to 0.6. Hexane was chosen to re-dispersed the ZnO nanoparticles.

The particle size, particle shape and particle size distribution of the ZnO nanoparticles in the monodispersion were analyzed by TEM and DLS. It is observed that the primary particle size of these ZnO nanoparticles is about 5 to 20 nm. The steepness ratio of the nanoparticles is about 1.4 to 2.0.

The XRPD analysis result demonstrates that the crystalline structure of the ZnO nanoparticles obtained in this example is the same as that of the ZnO nanoparticles obtained in Example 1.1 above.

Example 1.9

99.4 g $Zn(OAc)_2 \cdot 2H_2O$ was added to 1012 ml of Methanol (MeOH) in a 3-necked round bottom flask (RBF) to form a $Zn(OAc)_2$ solution. 43.2 g of KOH was dissolved with 1012 ml of MeOH followed by mixing with the $Zn(OAc)_2$ solution under vigorous stirring. The reaction temperature of the system was maintained at 62° C. 30 seconds after the KOH solution was mixed with the $Zn(OAc)_2$ solution, 10 g KH570 (γ-Methacryloxypropyl trimethoxy silane) dissolved in 506 ml methanol was added to the reaction solution. 2 minutes after the mixing of $Zn(OAc)_2$ solution and the KOH solution, 150 ml DI $H_2O$ was added to the reaction solution. The reaction solution was aged at 62° C. for 30 minutes.

The reaction solution was cooled to room temperature. DI $H_2O$ was added to precipitate the ZnO particles. The ZnO particles were left to settle and the supernatant was decanted. The settled ZnO layer was centrifuged at 3000 rpm for 5 minutes. The byproducts, which are ionic in nature, remained in the aqueous medium phase and were separated from ZnO particles such that the resultant ZnO particles are substantially free of by-products. 100 ml of ethanol was added to re-disperse the ZnO cake. The redispersed ZnO dispersion was dried to dryness under low pressure. The resulted ZnO powder was freely dispersed in various polar solvent such as ethanol, ethyl acetate (EtAc), methyl ethyl ketone (MEK) or mixtures thereof, and could form transparent dispersion with high solid loading (i.e. about 30 w/v %). The highest concentration achieved was about 70 w/v %. The ZnO nanoparticles obtained were subjected to various characterization analyses.

The ZnO nanoparticles obtained were characterized in relation to their crystal structures using the X-Ray Powder Diffraction (XRPD). The XRPD result is the same as that of the ZnO nanoparticles obtained in Example 1.1 above.

The mean particle size and particle size distribution of the ZnO nanoparticles were investigated using dynamic light scattering (DLS) particle size analyzer LB-500 characterization. It is observed that ZnO nanoparticles dispersed in ethanol with an average secondary particle size of 15 nm and size range of between 10 nm and 20 nm were obtained. The steepness ratio ($d_{90}/d_{10}$) of the particles is 1.7. The index of dispersion degree is 1.87. The ZnO nanoparticles dispersed in MEK with an average secondary particle size of 32 nm and size range of between 20 nm and 43 nm were obtained. The steepness ratio of the particles is 1.8. The index of dispersion degree is 4.0. The ZnO nanoparticles dispersed in EtAc with an average secondary particle size of 31 nm and size range of between 23 nm and 40 nm were obtained. The steepness ratio of the particles is 1.69. The index of dispersion degree is 3.87.

The primary particle size and particle shape of the ZnO nanoparticles obtained were characterized using TEM and HRTEM.

The TEM and HRTEM images indicate that the zinc oxide nanoparticles obtained in the polar solvents above are substantially monodispersed. The particle morphology was found to be substantially spherical. The primary particle size is about 5 nm. The size range is from 3 to 10 nm. Discrete specks of darker shades (ZnO nanoparticles) is clearly observed with little or no overlapping between the darker shades, indicating that there is little or no aggregation of the particles. Moreover, it is observed that the zinc oxide nanoparticles are approximately the same size, which is indicative of a narrow size distribution of nanoparticles present in the monodispersion.

Example 1.10

20.95 g of Methanol (MeOH) was added to $Zn(OAc)_2 \cdot 2H_2O$ (4.97 g) in a 3-necked round bottom flask (RBF). Some water was slowly added to the solution until complete dissolution of zinc acetate. 3.18 g of concentrated NaOH aqueous solution (49 wt %) was diluted with 20.95 g of MeOH followed by mixing with the $Zn(OAc)_2$ solution under vigorous stirring. The reaction temperature of the system was maintained at 62° C. 2 minutes after the NaOH solution was mixed with the $Zn(OAc)_2$ solution, 0.45 g KH570 dissolved in 23 ml MeOH was added to the reaction solution. 4 minutes after the NaOH solution was mixed with the $Zn(OAc)_2$ solution, 5 ml water was added to the mixed solution. The reaction solution was aged at 62° C. for 45 minutes.

The reaction solution was cooled to room temperature. DI $H_2O$ was added to precipitate the ZnO particles. The ZnO particles were left to settle and the supernatant was decanted. The settled ZnO layer was centrifuged at 3000 rpm for 5 minutes. The byproducts, which are ionic in nature, remain in the aqueous medium phase and were separated from ZnO particles such that the resultant ZnO particles are substantially free of by-products. 5 ml of ethanol was added to re-disperse the ZnO cake. The redispersed ZnO dispersion was dried to dryness under low pressure. The resulted ZnO powder was freely dispersed in ethanol, forming a transparent dispersion with high solid loading (i.e. about 30 w/v %). The highest concentration achieved was about 70 w/v %. The ZnO nanoparticles obtained were subjected to various characterization analyses.

The ZnO nanoparticles obtained were characterized in relation to their crystal structures using the X-Ray Powder Diffraction (XRPD). The XRPD result is the same as that of the ZnO nanoparticles obtained in Example 1.1 above.

The mean particle size and particle size distribution of the ZnO nanoparticles were investigated using dynamic light scattering (DLS) particle size analyzer LB-500 characterization. It is observed that ZnO nanoparticles dispersed in ethanol with an average secondary particle size of 16 nm and size range of between 12 nm and 24 nm were obtained. The steepness ratio ($d_{90}/d_{10}$) of the particles is 1.7.

The primary particle size and particle shape of the ZnO nanoparticles obtained were characterized using TEM and HRTEM. The TEM and HRTEM images indicate that the zinc oxide nanoparticles obtained in the polar solvents above are substantially monodispersed. The particle morphology was found to be substantially spherical. The primary particle size is about 8 nm. The size range is from 4 to 12 nm. The index of dispersion degree for the particles produced in this example is 2.0. Discrete specks of darker shades (ZnO nanoparticles) is clearly observed with little or no overlapping between the darker shades, indicating that there is little or no aggregation of the particles. Moreover, it is observed that the zinc oxide nanoparticles are approximately the same size, which is indicative of a narrow size distribution of nanoparticles present in the monodispersion.

Example 1.11

40 g of MeOH was added to $Zn(OAc)_2.2H_2O$ (4.97 g) to form zinc acetate solution. 2.16 g of KOH was added to 40 ml of MeOH to form a KOH solution. The KOH solution was then mixed with the $Zn(OAc)_2$ solution under vigorous stirring to form the reaction solution. The reaction temperature was maintained at 60° C. 0.4 g maltose was dissolved in 4.9 ml of distilled water, and subsequently diluted with 20 ml methanol. 45 seconds after the KOH solution was mixed with the $Zn(OAc)_2$ solution, the maltose solution was added to the reaction solution. The resulting solution was aged at 60° C. for 45 minutes.

The ZnO particles formed therein were isolated via centrifugation, and the supernatant was discarded. The ZnO centrifuge cake was washed with 150 ml of MeOH. The maltose capped ZnO particles were separated via centrifugation and subsequently redispersed in 10 ml water. 0.5 g KH792 (N-(β-Aminoethyl)-γ-amino-propyltrimethoxy silane) dissolved in 20 ml MeOH was added to the ZnO water dispersion and the mixture turned cloudy immediately. The cloudy solution showed a tint of blue colouration after heating at 60° C. for 15 minutes.

The above mixture was then dried under low pressure. The resulted powder was re-dispersed in 8 ml of distilled water. 40 ml of acetone was added to the KH792 caped ZnO dispersion and the solution turned cloudy immediately. The ZnO particles were isolated from the byproducts, which are ionic in nature, via centrifugation. The ZnO centrifuge cake was again redispersed in 8 ml of water and precipitated with 40 ml of acetone. The ZnO particles were again separated via centrifugation. The obtained ZnO centrifuge cake was subsequently dispersed in water and adjusted to the required concentration to form a ZnO water dispersion.

The ZnO nanoparticles obtained were characterized in relation to their crystal structures using the X-Ray Powder Diffraction (XRPD). The XRPD result is the same as that of the ZnO particles obtained in Example 1.1 above.

The mean particle size and particle size distribution of the ZnO nanoparticles were investigated using dynamic light scattering (DLS) particle size analyzer LB-500 characterization. It is observed that ZnO nanoparticles dispersed in ethanol with an average secondary particle size of 12 nm and size range of between 9 nm and 16 nm were obtained. The steepness ratio ($d_{90}/d_{10}$) of the particles is 1.7.

The primary particle size and particle shape of the ZnO nanoparticles obtained were characterized using TEM and HRTEM. The TEM and HRTEM images indicate that the zinc oxide nanoparticles obtained in the polar solvents above are substantially monodispersed. The particle morphology was found to be substantially spherical. The average primary particle size is about 4 nm. The size range is from 2 to 8 nm. The index of dispersion degree for the particles produced in this example is 3.0. Discrete specks of darker shades (ZnO nanoparticles) are clearly observed with little or no overlapping between the darker shades, indicating that there is little or no aggregation of the particles. Moreover, it is observed that the zinc oxide nanoparticles are approximately the same size, which is indicative of a narrow size distribution of nanoparticles present in the monodispersion.

Example 1.12

ZnO monodispersed particles were prepared in accordance with the process as described in Example 1.11 except that 0.8 g sucrose was used instead of 0.4 g maltose.

The particle size, particle shape and particle size distribution of the ZnO particles prepared in this Example were analyzed by TEM and DLS. The results obtained were similar to that of Example 1.11. It is further observed that the primary particle size of the particle is about 3 nm, and the steepness ratio of the ZnO nanoparticles is 1.6.

Example 1.13

1240 mL of MeOH was added to $Zn(OAc)_2.2H_2O$ (121.77 g) to form zinc acetate solution. 54.88 g of KOH was added to 1240 ml of MeOH to form a KOH solution. The KOH solution was then mixed with the $Zn(OAc)_2$ solution under vigorous stirring to form the reaction solution. The reaction temperature was maintained at 60° C. 14.7 g ethylene glycol (EG) was dissolved in 120 ml of distilled water, and subsequently diluted with 310 ml methanol. 30 seconds after the KOH solution was mixed with the $Zn(OAc)_2$ solution, the EG solution was added to the reaction solution. The resulting solution was aged at 60° C. for 45 minutes.

The ZnO particles formed therein were isolated via centrifugation, and the supernatant was discarded. The ZnO centrifuge cake was washed with 150 ml of MeOH. The EG capped ZnO particles were separated via centrifugation to form a centrifuge cake. 12.98 g KH792 dissolved in 25 mL MeOH was added to the ZnO centrifuge cake. 35 mL of $H_2O$ was added to the suspension of ZnO nanoparticles in MeOH-silane and the mixture turned clear. The clear solution was heated at 60° C. for 30 minutes.

The above reaction solution was then cooled to room temperature. 320 mL of acetone was added to the reaction solution under stirring and ZnO particles were precipitated. The ZnO particles were collected via centrifugation. The obtained ZnO centrifuge cake was subsequently dispersed in water and adjusted to the required concentration to form a ZnO water dispersion.

The ZnO nanoparticles obtained were characterized in relation to their crystal structures using the X-Ray Powder Diffraction (XRPD). The XRPD result is the same as that of the ZnO particles obtained in Example 1.1 above.

The mean particle size and particle size distribution of the ZnO nanoparticles were investigated using dynamic light scattering (DLS) particle size analyzer LB-500 characterization. It is observed that ZnO nanoparticles dispersed in ethanol with an average secondary particle size of 16 nm and size range of between 10 nm and 23 nm were obtained. The steepness ratio ($d_{90}/d_{10}$) of the particles is 1.7.

The primary particle size and particle shape of the ZnO nanoparticles obtained were characterized using TEM and HRTEM. The TEM and HRTEM images indicate that the zinc oxide nanoparticles obtained in the water above are substantially monodispersed. The particle morphology was found to be of the short rod shape. The primary particle size is about 5 nm. The size range is from 3 to 10 nm. The index of dispersion degree for the particles produced in this example is 3.2. Discrete specks of darker shades (ZnO nanoparticles) are clearly observed with little or no overlapping between the darker shades, indicating that there is little or no aggregation of the particles. Moreover, it is observed that the zinc oxide nanoparticles are approximately the same size, which is indicative of a narrow size distribution of nanoparticles present in the mono-dispersion.

Example 1.14

99.4 g $Zn(OAc)_2.2H_2O$ was added to 1011.4 ml of Methanol (MeOH) in a 3-necked round bottom flask (RBF) to form a $Zn(OAc)_2$ solution. 44.4 g of KOH was dissolved with 1011.4 ml of MeOH followed by mixing with the $Zn(OAc)_2$ solution under vigorous stirring. The reaction temperature of the system was maintained at 62° C. 1 minute after the KOH solution was mixed with the $Zn(OAc)_2$ solution, 14 g hexadecyltrimethoxysilane dissolved in 579.7 ml ethanol was added to the reaction solution. 3 minutes after mixing of the $Zn(OAc)_2$ solution and the KOH solution, 100 ml DI $H_2O$ was added to the reaction solution. The reaction solution was aged at 62° C. for 40 minutes.

The reaction solution was cooled to room temperature. The ZnO particles were left to settle and the supernatant was decanted. The settled ZnO layer was centrifuged at 3500 rpm for 4 minutes. The byproducts, which are ionic in nature, remained in the aqueous medium phase and were separated from ZnO particles that are substantially free of by-products. 50 ml of ethanol hexane was added to re-disperse the ZnO cake. The redispersed ZnO dispersion was dried to dryness under low pressure. The resulted ZnO powder was freely dispersed in various non-polar solvent such as hexane, toluene, heptane, benzene, decane, petro ether, octane and diesel, or mixtures thereof, and could form transparent dispersion with high solid loading (i.e. about 30 w/v %). The highest concentration achieved was about 70 w/v %. The ZnO nanoparticles obtained were subjected to various characterization analyses.

The ZnO nanoparticles obtained were characterized in relation to their crystal structures using the X-Ray Powder Diffraction (XRPD). The XRPD result is the same as that of the ZnO nanoparticles obtained in Example 1.1 above.

The mean particle size and particle size distribution of the ZnO nanoparticles were investigated using dynamic light scattering (DLS) particle size analyzer LB-500 characterization. It is observed that ZnO nanoparticles dispersed in hexane with an average secondary particle size of 29 nm and size range of between 10 nm and 60 nm were obtained. The steepness ratio ($d_{90}/d_{10}$) of the particles is 1.7.

The primary particle size and particle shape of the ZnO nanoparticles obtained were characterized using TEM and HRTEM. The TEM and HRTEM images indicate that the zinc oxide nanoparticles obtained in the non-polar solvents above are substantially monodispersed. The particle morphology was found to be substantially spherical. The primary particle size is about 9 nm. The size range is from 5 to 15 nm. The index of dispersion degree for the particles produced in this example is 3.2. Discrete specks of darker shades (ZnO nanoparticles) are clearly observed with little or no overlapping between the darker shades, indicating that there is little or no aggregation of the particles. Moreover, it is observed that the zinc oxide nanoparticles are approximately the same size, which is indicative of a narrow size distribution of nanoparticles present in the monodispersion.

Example 1.15

946 mL of MeOH was added to $Zn(OAc)_2.2H_2O$ (93.09 g) to form zinc acetate solution. 41.99 g of KOH was added to 350 ml of MeOH to form a KOH solution. The KOH solution was then mixed with the $Zn(OAc)_2$ solution under vigorous stirring to form the reaction solution. The reaction temperature was maintained at 60° C. 4.69 g Tetraethyl orthosilicate (TEOS) was dissolved in 25 ml of distilled water. 30 seconds after the KOH solution was mixed with the $Zn(OAc)_2$ solution, the TEOS solution was added to the reaction solution. 60 seconds after the KOH solution was mixed with the $Zn(OAc)_2$ solution, 40.8 ml distilled water was added to the reaction solution. 16.81 g KH570 was dissolved in 25 ml of distilled water. 15 minutes and 30 seconds after the KOH solution was mixed with the $Zn(OAc)_2$ solution, the KH570 solution was added to the reaction solution. The resulting solution was continued to age at 60° C. for 45 minutes.

The above reaction solution was then cooled to room temperature. 320 mL of water was added to the reaction solution under stirring and ZnO particles were precipitated. The ZnO particles were collected via centrifugation. The obtained ZnO centrifuge cake was subsequently dispersed in EtAc or EtOH to form a ZnO EtAc or EtOH dispersion.

The ZnO nanoparticles obtained were characterized in relation to their crystal structures using the X-Ray Powder Diffraction (XRPD). The XRPD result is the same as that of the ZnO particles obtained in Example 1.1 above.

The mean particle size and particle size distribution of the ZnO nanoparticles were investigated using dynamic light scattering (DLS) particle size analyzer LB-500 characterization. It is observed that ZnO nanoparticles dispersed in ethanol with an average secondary particle size of 31 nm and size range of between 23 nm and 60 nm were obtained. The steepness ratio ($d_{90}/d_{10}$) of the particles is 1.8.

The primary particle size and particle shape of the ZnO nanoparticles obtained were characterized using TEM and HRTEM. The TEM and HRTEM images indicate that the zinc oxide nanoparticles obtained in the EtAc dispersion above are substantially monodispersed. The particle morphology was found to be of spherical shape. The primary particle size is about 8 nm. The size range is from 5 to 12 nm. The index of dispersion degree for the particles produced in this example is 3.87. Discrete specks of darker shades (ZnO nanoparticles) are clearly observed with little or no overlapping between the darker shades, indicating that there is little or no aggregation of the particles. Moreover, it is observed that the zinc oxide nanoparticles are approximately the same size, which is indicative of a narrow size distribution of nanoparticles present in the mono-dispersion.

Example 2

Monodispersed $CeO_2$ Nanoparticles

Example 2.1

50 mL of water was added to $Ce(NO_3)_3 \cdot 6H_2O$ (4.27 g) in a 3-necked RBF. 25% ammonia solution was diluted with 47.5 mL water followed by mixing with the cerium nitrate solution under vigorous stirring. The temperature of the reaction system was 80° C.

4 to 7 minutes after the ammonia solution was mixed with the cerium nitrate solution, 20 mL of 0.04 mol/L sodium oleate solution was added to the reaction solution.

The reaction solution was stirred vigorously for an hour to obtain a yellow powder in a clear water solution. Hexane was added to the solution and the yellow powder dissolved almost immediately. The aqueous layer was removed using a separation funnel. About 30 mL of isopropyl alcohol was added to the hexane solution and a flocculent precipitate formed. The precipitate was centrifuged and washed with methanol and isopropyl alcohol. The resulted precipitate was freely dispersed in various long chain alkyl solvent such as hexane, heptane, toluene or mixtures thereof. The $CeO_2$ nanoparticles obtained were subjected to various characterization analyses as shown below.

The $CeO_2$ nanoparticles obtained were characterized in relation to their crystal structures using XRPD. The XRPD result is shown in FIG. 16.

Figure 16:
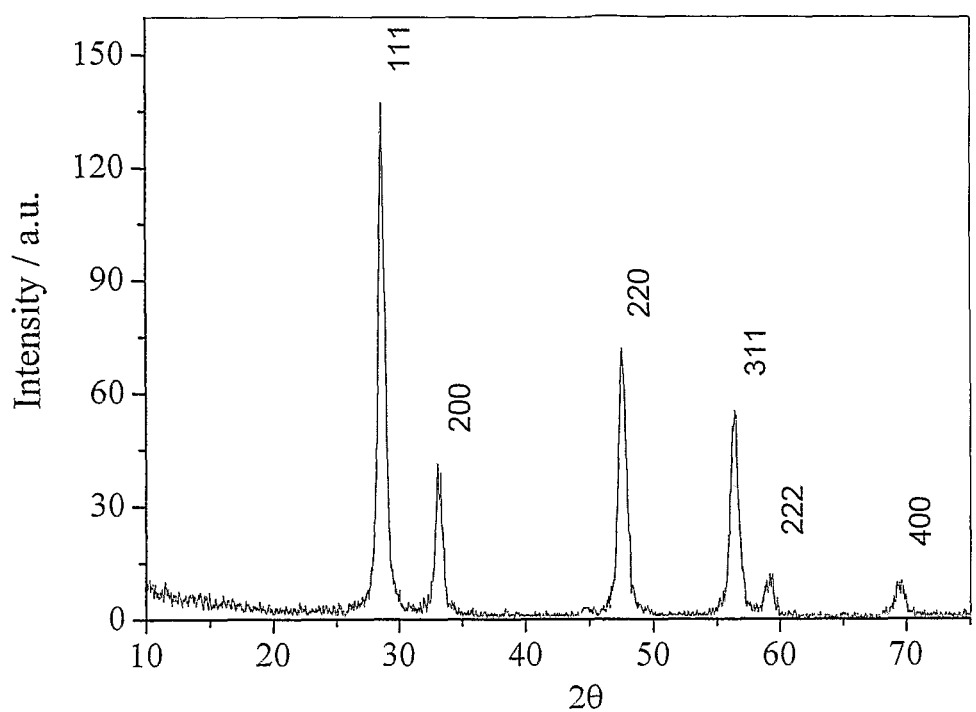
FIG. 16 shows an XRPD pattern of monodispersed $CeO_2$ nanoparticles prepared in example 2.2 below.

From FIG. 16, it was observed that the crystal structure of the $CeO_2$ nanoparticles obtained herein can be indexed to a typical face-centered-cubic fluorite structure.

The secondary particle size and particle size distribution of the $CeO_2$ nanoparticles obtained were investigated using DLS particle size analyzer LB-500 characterization. FIG. 15A shows the DLS result for the $CeO_2$ nanoparticles obtained.

From FIG. 15A, it can be observed that the $CeO_2$ nanoparticles obtained have a mean aggregate particle size of 45.8 nm. The steepness ratio of the $CeO_2$ nanoparticles is 1.67. Narrow peak width in the DLS graph also suggests that the $CeO_2$ nanoparticles are close to being monodispersed and have a narrow particle size distribution.

The primary particle size and particle shape of the $CeO_2$ nanoparticles obtained were characterized using HRTEM.

FIG. 14A and FIG. 14B are HRTEM images for exemplary $CeO_2$ nanoparticles obtained herein. It can be seen from FIG. 14A and FIG. 14B that cerium oxide nanoparticles obtained are substantially monodispersed. Discrete specks of darker shades ($CeO_2$ nanoparticles) can be clearly observed with little or no overlapping between the darker shades, indicating that there is little or no aggregation of the nanoparticles. Moreover, it is observed that the cerium oxide nanoparticles are approximately of the same size, which is indicative of the $CeO_2$ nanoparticles having a narrow size distribution in the monodispersion.

The $CeO_2$ nanoparticles obtained can be extracted and dried to form powders. The dried powder can be redispersed back in hexane to form a good monodispersion of $CeO_2$ nanoparticles. Dried powders of $CeO_2$ which are redispersed were investigated to determine their particle size distribution using DLS characterization. The results of the DLS characterization are shown in FIG. 15B.

It had been observed visually that a good monodispersion of $CeO_2$ nanoparticles was formed when the dried powder was redispersed back in hexane. The DLS result in FIG. 15B shows that the mean aggregate particle size is 78 nm. The steepness ratio of the particles is 2.0, which demonstrates that a monodispersion of $CeO_2$ nanoparticles can still be obtained by redispersing the dried power of $CeO_2$ (formed as described in this example) in hexane.

Comparative Example 2.1

50 mL of water was added to $Ce(NO_3)_3 \cdot 6H_2O$ (4.27 g) in a 3-necked RBF. 25% ammonia solution was diluted with 47.5 mL water followed by mixing with the cerium nitrate solution under vigorous stirring. The temperature of the reaction system was 80° C. The precipitate formed promptly when the ammonia solution was mixed with cerium oxide solution.

The reaction solution was stirred vigorously for an hour. During this time, the color of the slurry changed from violet-grey to light malt-brown to white-yellow. The precipitate was centrifuged and washed with ethanol and water. The washed white-yellow precipitate could be dispersed in water to form $CeO_2$ nanoparticles dispersion or dried to form dry powder of $CeO_2$ nanoparticles.

The XRPD analysis result demonstrates that the crystal structure of the $CeO_2$ nanoparticles obtained in this comparative example is the same as that of the $CeO_2$ nanoparticles obtained in Example 2.1 above.

Example 2.2

8.54 g of $Ce(NO_3)_3 \cdot 6H_2O$ was added into deionized (DI) water loaded in a 3-necked RBF to form 100 mL cerium nitrate solution with a concentration of 0.19 mol/L. 25% ammonia solution was diluted to 0.62 mol/L by DI water to form 100 mL solution followed by mixing with the cerium nitrate solution under vigorous stirring. The temperature of the reaction system was 85° C.

8 minutes after the ammonia solution was mixed with the cerium nitrate solution, 40 mL of 0.04 mol/L sodium oleate solution was added to the reaction solution.

The reaction solution was stirred vigorously for an hour to obtain yellow powder in a clear water solution. Hexane was added to the solution and the yellow powder dissolved immediately. The aqueous layer was removed using a separation funnel. About 50 mL of isopropyl alcohol was added to the hexane solution and a flocculent precipitate formed. The precipitate was centrifuged and washed with methanol and isopropyl alcohol. The resulted precipitate was free dispersed in various long chain alkyl solvent such as hexane, heptane, toluene or mixtures thereof. The $CeO_2$ nanoparticles obtained were subjected to various characterization analyses as shown below.

The primary particle size and particle shape for the $CeO_2$ nanoparticles obtained were characterized using HRTEM.

FIG. 17A and FIG. 17B are HRTEM images for exemplary $CeO_2$ nanoparticles produced herein. It can be seen from FIG. 17A and FIG. 17B that the cerium oxide nanoparticles obtained are substantially monodispersed. The average primary particle size is about 10 nm. Discrete specks of darker shades ($CeO_2$ nanoparticles) can be clearly observed with little or no overlapping between the darker shades, indicating that there is little or no aggregation of the particles. Moreover, it is observed that the cerium oxide nanoparticles are approximately of the same size, which is indicative of a narrow size distribution present in the monodispersion.

The secondary particle size and particle size distribution of the $CeO_2$ nanoparticles obtained were investigated using DLS particle size analyzer LB-500 characterization. FIG. 18 shows DLS result for the $CeO_2$ nanoparticles prepared in this example.

From FIG. 18, it can be observed that the $CeO_2$ nanoparticles have a mean aggregate particle size of 49.2 nm. The steepness ratio of the $CeO_2$ nanoparticles is 1.7. The narrow peak width in DLS graph also suggests that the $CeO_2$ nanoparticles are close to being monodispersed and have a narrow particle size distribution.

The XRPD analysis result demonstrates that the crystal structure of the $CeO_2$ nanoparticles obtained in this example is the same as that of the $CeO_2$ nanoparticles obtained in Example 2.1.

Example 2.3

Cerium oxide monodispersed nanoparticles were prepared in accordance with the process as described in example 2.2 except that the volumes of cerium nitrate and ammonium solutions were all 500 mL. The concentrations of cerium nitrate and ammonia are the same as that described in example 2.2. Hexane was chosen to re-dispersed the ZnO nanoparticles.

The particle size, particle shape and particle size distribution of the $CeO_2$ nanoparticles in the monodispersion were analyzed by TEM and DLS. From FIG. 19A and FIG. 19B, it is shown that the primary particle size of the $CeO_2$ nanoparticles is about 12 nm. The steepness ratio of the $CeO_2$ nanoparticles by DLS is about 1.8, which is shown in FIG. 20.

The XRPD analysis result demonstrates that the crystal structure of the $CeO_2$ nanoparticles obtained in this example is the same as that of the $CeO_2$ nanoparticles obtained in Example 2.1.

Example 3

Monodispersed Iron Oxide Nanoparticles 1.0 mL of 37% conc. HCl was dissolved in DI water to obtain 50 mL of 0.24 M HCl in a volumetric flask. 1.49 g of $FeCl_2.4H_2O$ and 2.44 g of $FeCl_3$ were dissolved in 50 mL of 0.24 M HCl with vigorous stirring. The turbid suspension was filtered with 0.22 µm filter paper under vacuum filtration. 10 mL of 25% $NH_3$ was mixed with 40 mL of DI water to obtain 50 mL of 2.68 M $NH_3$. 1.5 g sodium oleate was placed in a 100 mL flask and 20 mL DI water was added to the 100 mL flask. The flask was heated to 70 to 80° C. to make sodium oleate dissolve entirely. Sodium oleate solution was loaded to a three-neck flask and placed it into a water bath that is maintained at a temperature of 90° C. Under room temperature (~20° C.), ammonia solution was added to the iron salts solution with vigorous stirring. Five minutes later, the reacting solution was loaded to the above-mentioned three-neck flask (at 90° C.) with stirring and mixing with sodium oleate solution. The stirring was continued for 2 hours. After reacting for two hours, about 120 mL of acetone (or about the same volume as the reaction mixture) was added, which resulted in a high degree of precipitation. After centrifugation at 2000 rpm for 3 min, the top clear liquid is decanted and removed. The precipitate was washed twice using methanol and once using IPA. About 10 to 15 mL of hexane was added to the resultant precipitate. Upon shaking of the centrifuge bottle, the precipitate could be re-dispersed in hexane completely. The iron oxide nanoparticles obtained are subjected to various characterization analyses as shown below.

The particle size, particle shape and particle size distribution of iron oxide nanoparticles in hexane solution were analyzed by TEM and DLS.

Figure 21A:
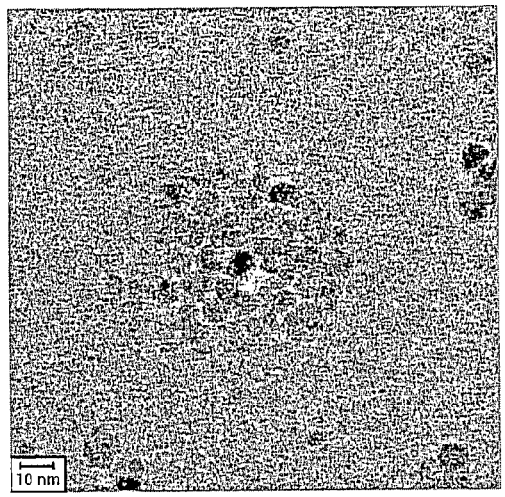
FIG. 21A and FIG. 21B show HRTEM images of monodispersed $Fe_3O_4$ nanoparticles prepared in example 3.1 below.
Figure 21B:
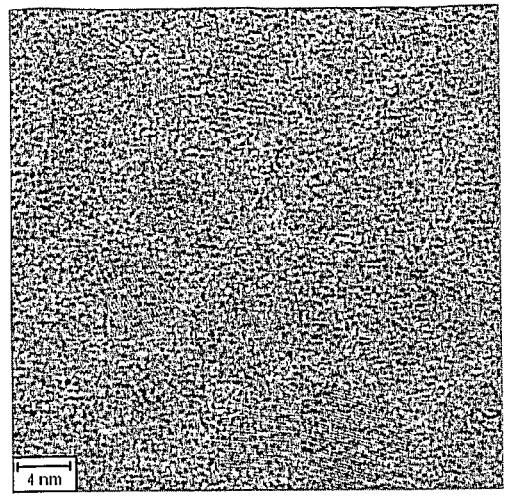

FIG. 21A and FIG. 21B are HRTEM images for exemplary iron oxide nanoparticles obtained herein. It can be seen from FIG. 21A and FIG. 21B that the iron oxide nanoparticles obtained are substantially monodispersed. The particle morphology was found to be spherical. The primary particle size is about 4 to 8 nm. Discrete specks of darker shades ($Fe_3O_4$ nanoparticles) can be clearly observed with little or no overlapping between the darker shades, indicating that there is little or no aggregation of the nanoparticles. Moreover, it is observed that the iron oxide nanoparticles are approximately the same size, which is indicative of a narrow size distribution of nanoparticles present in the monodispersion.

Figure 22:
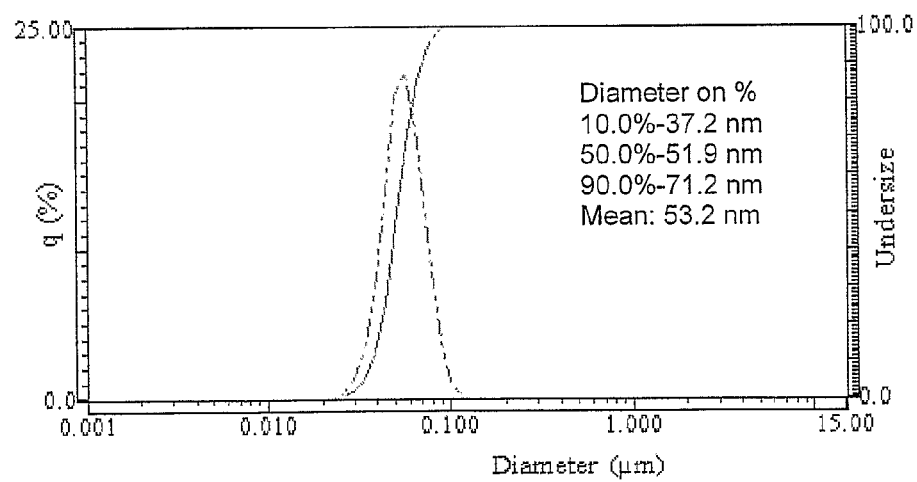
FIG. 22 shows a DLS pattern of monodispersed $Fe_3O_4$ nanoparticles prepared in example 3.1 below.

FIG. 22 depicts the results obtained from the DLS characterization. From FIG. 22, it can be observed that the iron oxide nanoparticles have an average secondary particle size of 53.2 nm and a size range of between 25 nm to 100 nm. The steepness ratio ($d_{90}/d_{10}$) of the iron oxide nanoparticles is 1.9. Narrow peak width in the DLS graph also suggests that the iron oxide nanoparticles are close to being monodispersed and have a narrow particle size distribution.

Figure 23:
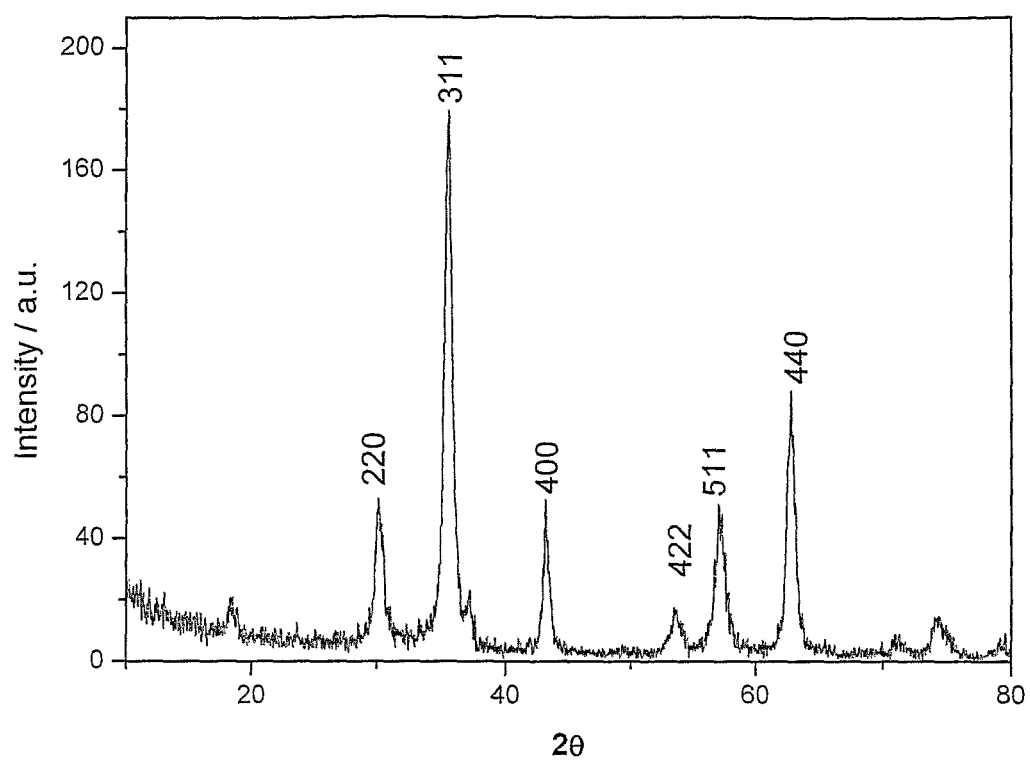
FIG. 23 shows an XRPD pattern of monodispersed $Fe_3O_4$ nanoparticles prepared in example 3.1 below.

The iron oxide nanoparticles obtained were characterized in relation to their crystal structures using the X-Ray Powder Diffraction (XRPD). The XRPD result is shown in FIG. 23. It can be seen from FIG. 23 that the crystal structure of the iron oxide nanoparticles obtained almost exclusively corresponds to a magnetite crystalline system.

Example 4

Monodispersed Copper Oxide Nanoparticles 4.5 g of $Cu(OAc)_2.H_2O$ was added to 50 mL DI water in a 3-necked RBF. 3.07 g of concentrated NaOH aqueous solution (49.8 wt %) was diluted with 48.5 mL DI water followed by mixing with the $Cu(OAc)_2$ solution under vigorous stirring. The reaction temperature of the system was maintained at 85° C. 2 minutes after the NaOH solution was mixed with the $Cu(OAc)_2$ solution, 20 mL of 0.08 mol·$L^{-1}$ sodium oleate aqueous solution was added to the reaction solution. Black precipitate formed almost immediately after the addition of sodium oleate. The reaction solution was aged at 85° C. for 1 hour.

40 mL of hexane was added to the reaction solution. The black precipitate dissolved upon addition of hexane and was extracted into hexane forming a black solution upon stirring. The aqueous layer was removed using a separation funnel. About 40 mL of IPA was added to the hexane solution and a flocculent precipitate formed. The precipitate was centrifuged and washed with MeOH and IPA. The resulted black precipitate was freely dispersed in various long chain alkyl solvents such as hexane, heptane, toluene, benzene, decane, octane or mixtures thereof, and could form transparent dispersion with high solid loading (i.e. ≥30 w/v %). The CuO nanoparticles obtained were subjected to various characterization analyses as shown below.

The particle size, particle shape and particle size distribution of CuO nanoparticles in hexane solution were analyzed by TEM and DLS.

FIG. 24A and FIG. 24B are HRTEM images for exemplary CuO nanoparticles obtained herein. It can be seen from FIG. 24A and FIG. 24B that the copper oxide nanoparticles obtained are substantially monodispersed. The particle morphology was found to be near-dendrites. The primary particle size is about 2 to 5 nm. Discrete specks of darker shades (CuO nanoparticles) can be clearly observed with little or no overlapping between the darker shades, indicating that there is little or no aggregation of the nanoparticles. Moreover, it is observed that the copper oxide nanoparticles are approximately of the same size, which is indicative of a narrow size distribution of nanoparticles present in the monodispersion.

FIG. 25 depicts the results obtained from the DLS characterization. From FIG. 25, it can be observed that the CuO nanoparticles have an average secondary particle size of 65.2 nm and a size range of between 28 nm and 75 nm. The steepness ratio ($d_{90}/d_{10}$) of the particles is 1.79. Narrow peak width in DLS graph also suggests that the CuO nanoparticles are close to being monodispersed and have a narrow particle size distribution.

Figure 26:
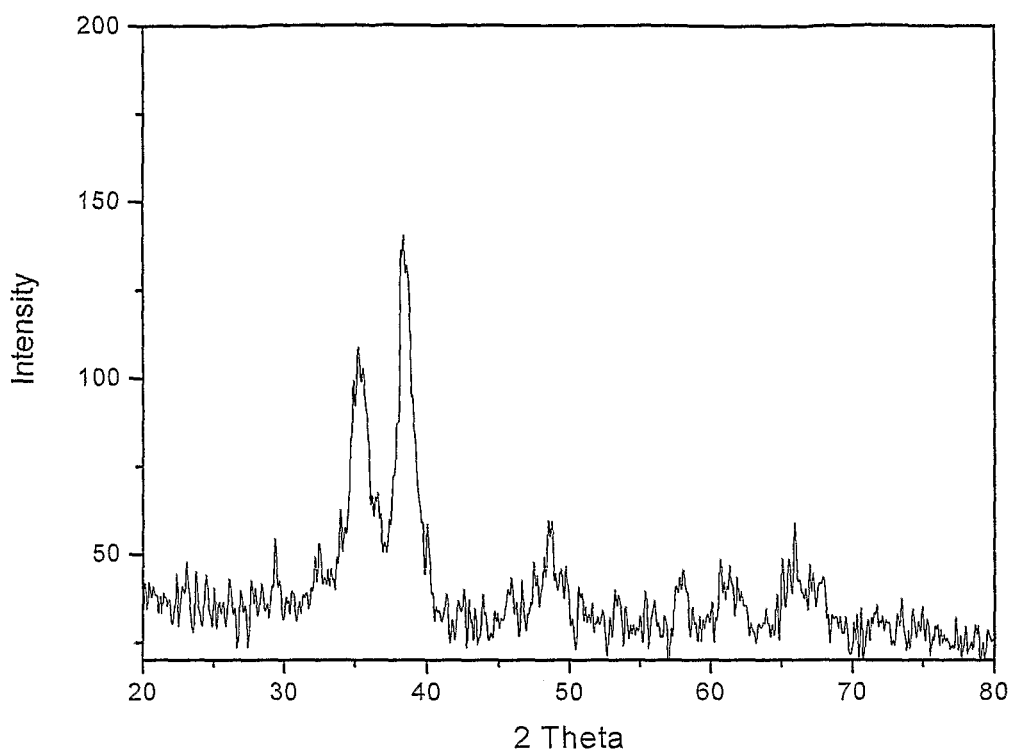
FIG. 26 shows an XRPD pattern of monodispersed CuO nanoparticles prepared in example 4.1 below.

The particles obtained from the experimental conditions described in example 4.1 above were characterized in relation to their crystal structures using XRPD. The XRPD result was shown in FIG. 26. The XRD pattern shown in FIG. 26 indicates the formation of phase-pure monoclinic CuO crystallites (JCPDS file No. 05-0661). The broadening of XRD lines results from the small size of nano dendrites.

Applications

It will be appreciated that the disclosed process can enable direct synthesis of metal chalcogenide or metal oxides particles in the substantially monodispersed state. The metal chalcogenide particles may have a high concentration as defined by its high solids loading. The metal chalcogenide particles may be in the nano-sized range.

Advantageously, the disclosed process synthesizes metal chalcogenides or metal oxide particles directly without the need for additional steps such as calcination, which may significantly increase the cost of production on a large scale.

Advantageously, the reactants used in the disclosed process are commercially available and economically priced. More advantageously, the process does not require the use of high temperatures and pressures. This lowers the cost of production and reduces the deterioration of the equipment used in the process. There is no additional need for the use of expensive reactants for the large scale production of the metal chalcogenides and metal oxides particles.

Advantageously, the monodispersion produced from the disclosed process may be more stable as compared to known monodispersion in that the particles do not agglomerate, and the dispersion do not have ionic impurities. The disclosed monodispersion can be kept at room temperatures and atmospheric pressures for a period of more than one month without any appreciable loss in stability properties. The nano-sized metal chalcogenides and metal oxides particles can also be redispersed in an solvent to substantially reform into a monodispersion, without any appreciable loss in physical stability.

More advantageously, the disclosed process enables a highly concentrated dispersion or dry powder of nano-sized metal chalcogenides and metal oxides particles to be kept in a substantially monodispersed state, reducing amount of storage space that would usually be required to store the same amount of nano-sized particles in a substantially monodispersed state. This may reduce the cost of transportation as a high concentration of metal chalcogenide particles can be transported in a smaller volume as compared to known products.

Advantageously, the incorporation of the ageing step into the process can result in an increase in particle cystallinity, change of the particle crystal structure or increase in particle size of the formed nano-sized precipitate particles to the micro-sized range.

Advantageously, the liquid-liquid phase transfer step may provide a simple and effective solution to remove the by-products that may be ionic in nature that may cause destabilization of the monodispersion.

It will be appreciated that the capacity of the process can be scaled up to form larger quantities of metal chalcogenide particles, without affecting the stability and the particle size distribution of the product.

Advantageously, the metal chalcogenide particles may be re-dispersed in a suitable dispersion medium that may be dependent on the needs of the user for the end-product. Accordingly, a polar solvent or a non-polar solvent may be used as the dispersion medium. The metal chalcogenide particles may be suitable for use in an organic matrix material, such as a polymeric material, according to the requirements of the end-product.

It will be apparent that various other modifications and adaptations of the invention will be apparent to the person skilled in the art after reading the foregoing disclosure without departing from the spirit and scope of the invention and it is intended that all such modifications and adaptations come within the scope of the appended claims.

The invention claimed is:

1. A process of making metal chalcogenide particles, the process comprising the steps of:
reacting a metal salt solution with a precipitant solution at a temperature of less than about 100 degrees Celsius for a time duration of less than 90 minutes under high shear conditions to form metal chalcogenide particles and by-product thereof, wherein said precipitant solution is an oxygen-containing base solution or a chalcogenide salt solution;
coating said metal chalcogenide particles with a surfactant; and
separating the surfactant coated chalcogenide particles from the by-product to obtain said metal chalcogenide particles substantially free of said by-product;
wherein said surfactant is a silane coupling agent or a metal organic salt having a polar group and an apolar group thereon.

2. The process according to claim 1, wherein the separating is undertaken using liquid-liquid phase transfer or by removing the by-product from the metal chalcogenide particles with a washing solution.

3. The process according to claim 2, wherein said removing step comprises the step of: washing said metal chalcogenide particles with an aqueous medium.

4. The process according to claim 1, wherein the reacting step is undertaken at least one of the following conditions:
(i) in non-acidic conditions; and
(ii) in an aqueous medium.

5. The process according to claim 1, wherein the surfactant is selected such that a monodispersion of said chalcogenide particles is formed.

6. The process according to claim 5, wherein the monodispersion is substantially transparent.

7. The process according to claim 5, wherein the solid content of said monodispersion is at least 5% by weight.

8. The process according to claim 1, wherein the metal chalcogenide particles are metal oxide particles.

9. The process according to claim 8, wherein the metal oxide particles are at least one of zinc oxide, cerium (IV) oxide, iron oxide, copper oxide, zirconium oxide and titanium oxide particles.

10. The process according to claim 1, further comprising the step of: ageing said surfactant coated particles before said separating step.

11. The process according to claim 1, wherein said metal salt solution during said reacting step is in molar equal or excess relative to a stoichiometric amount of said precipitant solution.

12. The process according to claim 1, wherein the surfactant is selected such that the surfactant coated chalcogenide particles are substantially mono-dispersed.

13. The process according to claim 1, wherein a first surfactant and a second surfactant are provided in said coating step, said first surfactant being selected to promote chemical bonding between said metal chalcogenide particle and said second surfactant.

14. The process according to claim 13, wherein said first surfactant is selected from the group consisting of sucrose, tetraethyl orthosilicate, ethylene glycol and maltose.

15. The process according to claim 13, wherein said second surfactant is a silane coupling agent.

16. The process according to claim 1, comprising the step of selecting a mass concentration of said surfactant from a value in the range of 0.001 g/mL to 0.3 g/mL.

17. The process according to claim 1, wherein said metal chalcogenide particles are redispersed in a dispersion medium selected from the group consisting of water, ethyl acetate, alcohols, alkenes, ethers, ketones and aromatic solvents.

* * * * *